United States Patent [19]

Anderson et al.

[11] 4,247,740
[45] Jan. 27, 1981

[54] TRUNK INTERFACE CIRCUIT

[75] Inventors: Eugene S. Anderson; Charles D. Gavrilovich, both of Naperville, Ill.

[73] Assignee: Bell Telephone Laboratories, Incorporated, Murray Hill, N.J.

[21] Appl. No.: 59,080

[22] Filed: Jul. 19, 1979

[51] Int. Cl.³ .............. H04M 15/00; H04Q 3/54; H04Q 3/58
[52] U.S. Cl. ............... 179/18 AH; 179/7.1 R; 179/18 ES; 179/18 FG
[58] Field of Search ........ 179/18 AH, 18 AG, 18 ES, 179/18 E, 18 FG, 18 FF, 175.2 C, 7.1 R, 7 R, 7 MM

[56] References Cited

U.S. PATENT DOCUMENTS

| | | | |
|---|---|---|---|
| 3,336,442 | 8/1967 | Casterline et al. | 179/18 ES |
| 4,001,509 | 1/1977 | McDonald et al. | 179/7.1 R |
| 4,113,988 | 9/1978 | Mukaemachi et al. | 179/18 ES |
| 4,160,129 | 7/1979 | Peyser et al. | 179/18 E |

OTHER PUBLICATIONS

"No. 1 Electronic Switching System", Bell System Technical Journal, vol. 43, No. 5, Sep. 1964, pp. 2328-2342.

Primary Examiner—Thomas W. Brown
Attorney, Agent, or Firm—Kenneth H. Samples; Peter Visserman

[57] ABSTRACT

A trunk interface circuit (105) is disclosed for executing communication and signaling functions associated with telephone calls between subscriber stations of separate telecommunication systems (100, 140). A semiautonomous control circuit (200) is responsive to state signals generated from a central control circuit (120) for establishing the trunk interface circuit (105) in a plurality of states. The semiautonomous control circuit (200) comprises a memory (320) having predetermined data stored therein corresponding to each of the plurality of states. A processor (300) within the semiautonomous control circuit (200) executes certain of the communication and signaling functions as determined by the stored data corresponding to the present state of the trunk interface circuit (105). The communication functions comprise reception of periodic charging pulses from a distant office and subsequent transmittal of signals to the central control circuit (120) representative of the charging pulses.

22 Claims, 25 Drawing Figures

READ-WRITE MEMORY STATUS

FIG. 8
STATE CONTROL BLOCKS FOR EACH STATE

TYPICAL INTEROFFICE CALL STATE DIAGRAM

GENERAL INSTRUCTION MODULE
FOR EACH STATE

MAIN SEQUENCE DIAGRAM

PERFORM REQUIRED OUTPULSING
(OUTPLS)

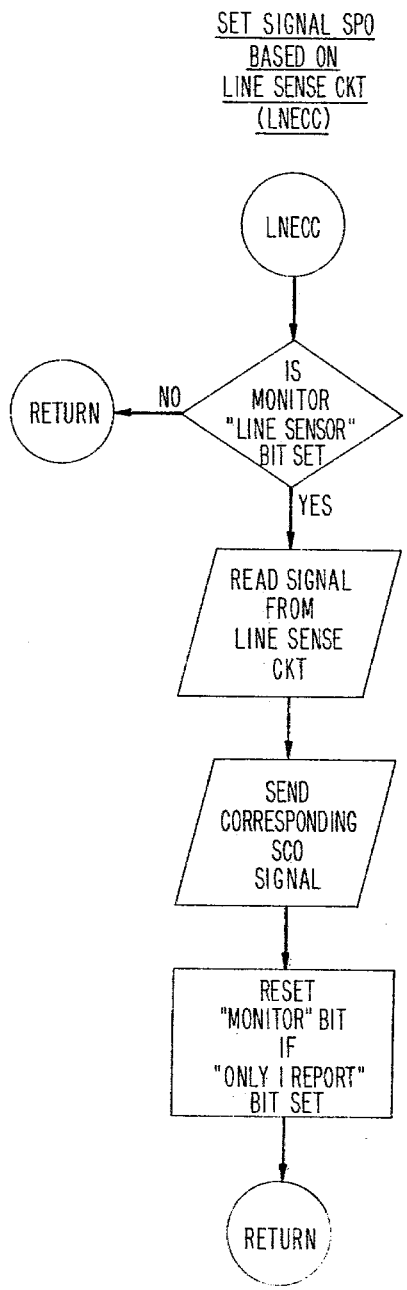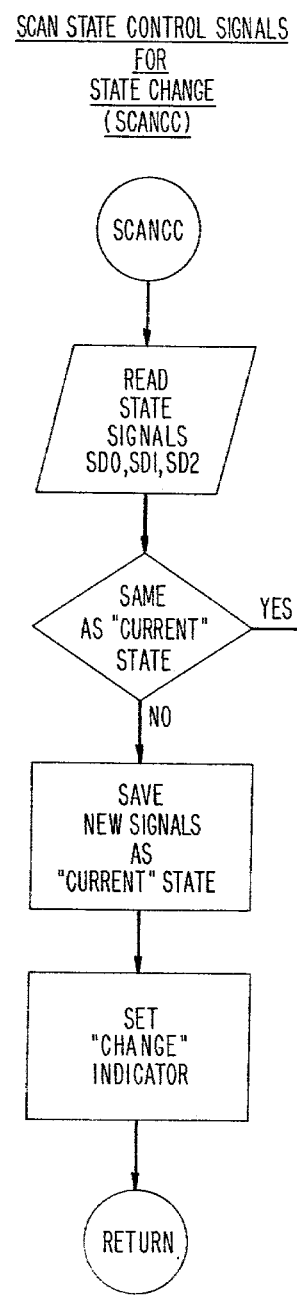

TIMER INTERRUPT ROUTINE
INTRPT

TRUNK INTERFACE CIRCUIT

TECHNICAL FIELD

This invention relates to telecommunication systems and, more particularly, to trunk interface circuits for establishing and monitoring communication among telephone switching systems.

BACKGROUND OF THE INVENTION

For purposes of communication between telephone subscriber stations associated with separate and distinct telecommunication switching systems, "communication trunks" are utilized and defined as communication channels interconnecting the switching systems. A communication trunk comprises a transmission facility, and a controllable trunk interface circuit in each switching system which serves to establish communication and signaling paths between the transmission facility and the circuits of the switching system.

A modern electronic telephone switching system typically comprises a central processor which provides operational control of the communications trunk by transmitting control signals to the trunk interface circuit via signal distributing circuitry. Scanner output signals representative of information signals received from the other telecommunication system and of the operational state of the interface circuit are transferred to the central processor via scanner circuitry connected to the trunk interface circuit. Several problems exist in the prior art systems using conventional trunk interface circuits, in both electronic and electromechanical telephone systems. To accommodate communication with different types of systems, communication trunks of various classifications are required which has necessitated nonuniform trunk circuit architecture. This variance in trunk circuit design is alleviated somewhat in electronic telephone systems by the assignment of control of the trunk interface circuit to the central processor, which generates state signals which determine the operational states of the trunk interface circuit. However, such direct control of these operations requires extensive real-time processing, and is costly in both processing time and stored program complexity. Additionally, when an electronic telephone system is connected to a system having a unique method of signaling, additional central processing programs may be required and existing programs are likely to require extensive modification.

A further problem is particularly associated with "periodic pulse metering" (PPM) systems employed in telephone systems in several countries. "Periodic pulse metering" refers to a system which utilizes charging pulses transmitted to the telecommunication system associated with a calling subscriber station wherein the transmittal occurs during the duration of the call on a periodic basis. These pulses require periodic accumulation and other real-time intensive tasks to be performed by the telecommunication system associated with the calling subscriber station. Attempts have been made in the prior art to overcome this problem by means of complex logic circuitry residing in the trunk interface circuits. Such circuitry is costly and does not solve the problem of nonuniform trunk circuit architecture. Further, it requires nonuniform interface circuits between the central processor and the trunk interface circuits.

SUMMARY OF THE INVENTION

Advantageously, in accordance with this invention, a technical advance is achieved in a telecommunication system comprising a trunk interface circuit and a central control circuit by controlling the execution of real-time intensive trunk switching and signaling functions by means of a semiautonomous control circuit.

In a telecommunication system according to the invention having a switching network, a central control circuit adapted for generating sets of state signals, and a communications trunk connected to a remote telecommunication system and comprising a transmission facility and a trunk interface circuit, the trunk interface circuit includes a semiautonomous control circuit having a memory with sets of data words stored therein corresponding to the sets of state signals. The semiautonomous control circuit executes control functions determined by the state signals and corresponding sets of data words for selectively receiving or transmitting signaling information on the transmission facility or establishing communication paths between the network and the transmission facility.

A switching arrangement within the trunk interface circuit is controlled by the semiautonomous control circuit for establishing communication connections between the network and the remote telecommunication system. Further, the switching arrangement is utilized to connect a sensing arrangement to various conducting paths for purposes of signal detection. Specifically, the sensing arrangement comprises a first sense circuit selectively connectible to the transmission facility for detecting information signals received from the remote telecommunication system. Similarly, a second sense circuit is connectible to communication lines between the switching network and the transmission facility for detecting the presence of signals thereon. In accordance with the invention, the semiautonomous control circuit is responsive to certain of the state signals to store data in the memory representative of the detected signals.

The trunk interface circuit further comprises scanner communication lines for transmitting scanner signals to the central control circuit which are representative of the detected signals and of data stored in the memory. Specifically, the detected information signals may be periodic charging pulses received from the remote telecommunication system and determinative of the monetary charging rate for a telephone call established through the trunk interface circuit. Similarly, the scanner signals may comprise pulses representative of data stored in the memory corresponding to the monetary charging rate for the call.

The transmission facility comprises a transmission path for transmitting signaling pulses to the remote telecommunication system. The semiautonomous control circuit is responsive to a first set of state signals occurring during a first duration of time for storing data indicative of the status of the trunk interface circuit and further responsive to a second set of state signals occurring during a second duration of time for transmitting signaling pulses on the transmission path corresponding to the stored data.

The memory further comprises sets of memory words having predetermined data stored therein and the trunk interface circuit has a plurality of states with each state uniquely corresponding to one of the sets of memory words. A change of the trunk interface circuit from one of the states to another is effected by a binary transition of one of the state signals generated by the central control circuit. A processor within the semiautonomous control circuit executes sequences of instructions stored in sets of memory words in the memory, with each set corresponding to one of the plurality of states. Further, the memory comprises a common set of memory words having instructions stored therein and selective execution of the instructions is determined by the sets of memory words having predetermined data stored therein.

A method, in accordance with the invention, for utilizing the trunk interface circuit to transmit signaling pulses to the remote telecommunication system comprises the steps of storing in the memory data words representative of the signaling pulses to be transmitted and generating a set of state signals from the central control circuit corresponding to one of the plurality of states of the trunk interface circuit. The data words corresponding to the same one of the plurality of states are retrieved from the memory and signaling pulses having durations of time determined by the retrieved words are transmitted to the remote telecommunication system.

Advantageously, in a system according to the invention, conventional scanner and distributor arrangement may be used for communication between the trunk interface circuit and the central control circuit, independent of the type and number of control functions required. Further, the arrangement of the invention specifically provides compatibility between existing electronic telecommunication systems and systems employing various signaling methods, including periodic pulse metering processes wherein pulses determinative of the monetary charging rate for a telephone call are received on a periodic basis.

BRIEF DESCRIPTION OF THE DRAWING

The invention may be better understood from the following detailed description when read with reference to the drawing in which:

FIG. 8 depicts the values of data bits within state control blocks shown in FIG. 6;

FIGS. 10 through 25 are sequence diagrams of actions to be performed by the processor depicted in FIG. 5 in controlling the illustrative trunk interface circuit.

DETAILED DESCRIPTION

Figure 1:
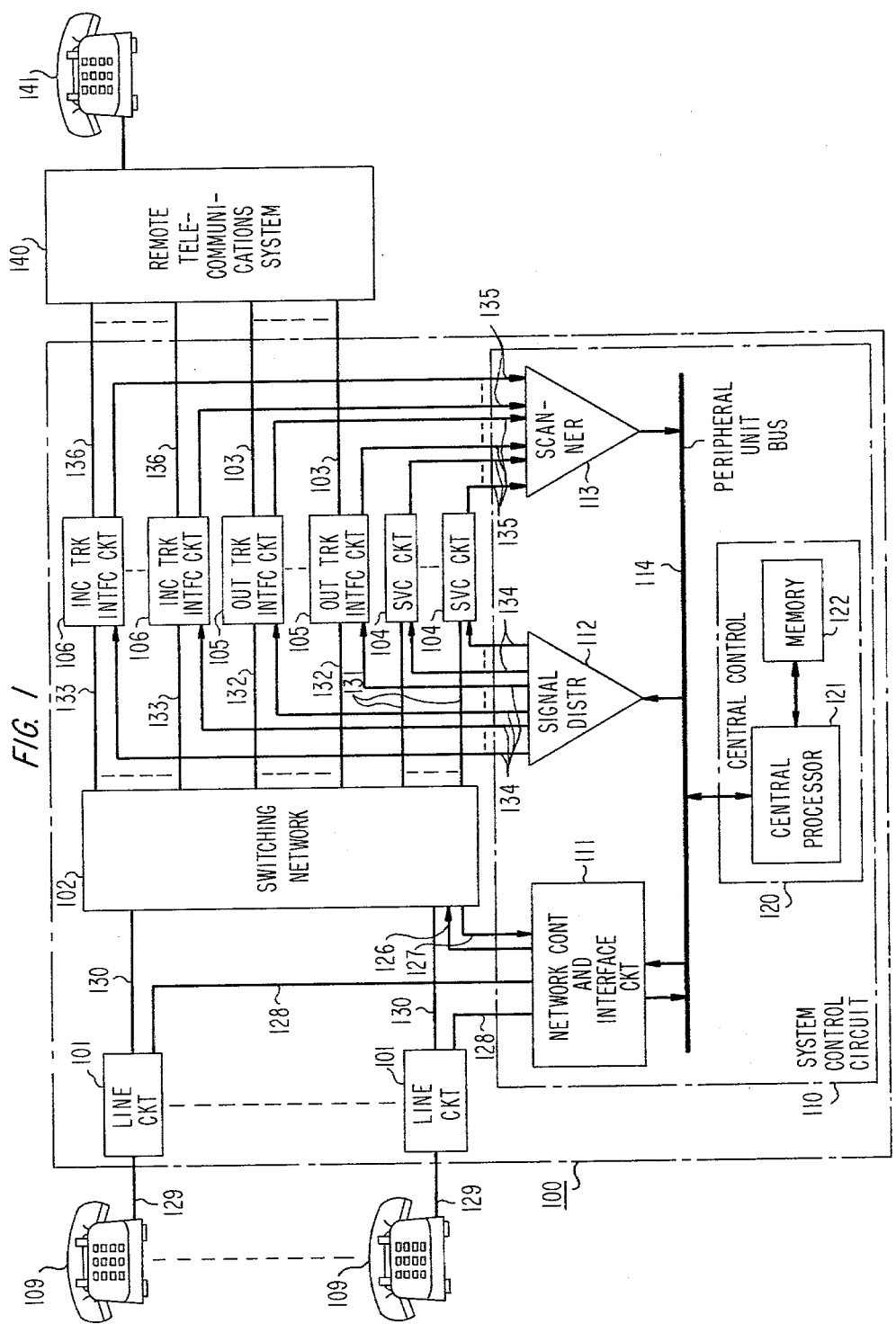
FIG. 1 is a block diagram of one illustrative embodiment of a telecommunication system comprising a trunk interface circuit in accordance with the invention.

The principles of this invention are disclosed, by way of example, in an electronic stored program controlled telecommunication system 100 depicted in block diagram form in FIG. 1. A system of this type is described in general terms in articles entitled "No. 1 Electronic Switching System", *The Bell System Technical Journal,* Vol. 43, No. 5, September, 1964.

The illustrative telecommunication system 100 is designed to serve a plurality of subscriber stations 109, each interconnected to a switching network 102 via a corresponding line circuit 101 and corresponding communication lines 129 and 130 as shown in FIG. 1. Line circuits 101 may comprise supervisory elements, such as the well-known line ferrods, to provide for detection of subscriber station transitions, i.e., "on-hook" to "off-hook" or "off-hook" to "on-hook" transitions. Switching network 102 comprises various network switches and junctor circuits and may be any well-known telephone network configuration such as disclosed, for example, in the aforementioned articles published in *The Bell System Technical Journal.* Additionally, service circuits 104, outgoing trunk interface circuits 105, and incoming trunk interface circuits 106 are connected to the network 102 via communication lines 131, 132, and 133, respectively. Service circuits 104 comprise circuits necessary for origination and termination of telephone calls, such as customer dial pulse receivers, ringing control circuits, and audible tone circuits, all of which are well known in the art. The trunk interface circuits 105 and 106 will be described in subsequent paragraphs herein.

In the illustrative embodiment shown in FIG. 1, the system control circuit 110 comprises a network controller and interface circuit 111, signal distributor 112, scanner circuit 113, central control circuit 120, and a peripheral unit bus 114 for establishing data communication among the aforementioned circuitry. Central control circuit 120 comprises a central processor 121 and a memory 122 for execution of stored program instructions to perform various functions relating to operations of telecommunication system 100. The various elements of the system control circuit 110 are well known in the art and are generally described in the aforementioned articles published in *The Bell System Technical Journal.*

The network controller and interface circuit 111 are utilized to send various interconnection command signals to switching network 102 and to detect signals from line circuits 101 and switching network 102 representative of supervisory information, such as the on-hook and off-hook status of subscriber stations 109 and results of the monitoring of specific test points within switching network 102. The signal distributor 112 is utilized to selectively send command signals from central control circuit 120 to various circuitry within telecommunication system 100 via communication lines 134 as shown in FIG. 1. Scanner circuit 113 receives signals on scanner communication lines 135 which indicate the status of the service circuits 104 and outgoing and incoming trunk interface circuits 105 and 106, respectively. As will be described in subsequent paragraphs, scanner circuit 113 also provides for reception of data other than mere status information from the outgoing trunk interface circuits 105.

The term "central office" is commonly used to denote the switching apparatus and associated equipment of a telecommunication system. Accordingly, the term "intraoffice call" is used to denote a call originating from one of the subscriber stations 109 and terminating on another of the stations 109 connected to the same central office. Similarly, an "interoffice call" is a call initiating from a subscriber station of the originating office and extending to a station of another central office, referred to as the distant office. Referring to FIG. 1 for exemplary purposes of description, when one of subscriber stations 109 associated with system 100 is the called subscriber station of a telephone call originated by a calling subscriber station 141 associated with a remote telecommunication system 140, i.e., a distant office, a communication path is established from the remote telecommunication system 140 to incoming trunk transmission facility 136 as shown in FIG. 1 which terminates on one of incoming trunk interface circuits 106. The trunk interface circuit 106 provides control circuitry for establishing various communication path configurations between transmission facility 136 and communication line 133 which is connected to switching network 102. A completed communication path to the called subscriber station 109 is established via internal circuitry of switching network 102 and the corresponding communication lines 129 and 130 and line circuit 101 connected to the called subscriber station 109. Similarly, when one of the subscriber stations 109 originates an interoffice call, i.e., a call to a subscriber station 141 associated with remote telecommunication system 140, a path is established to one of outgoing trunk interface circuits 105 via the corresponding lines 129 and 130, line circuit 101, switching network 102, and communication line 132 as shown in FIG. 1. The outgoing trunk interface circuit 105 provides control circuitry, similar to that of incoming trunk interface circuit 106, for establishing communication path configurations between line 132 and trunk transmission facility 103 which is connected to the remote telecommunication system 140 associated with the called subscriber station 141.

The trunk interface circuits 105 and 106 comprise, in addition to circuitry for connecting the trunk transmission facilities in various electrical path configurations to switching network 102, circuitry for transmitting and receiving signaling information to and from the remote telecommunication system 140. As previously described, control signals to operate each of trunk interface circuits 105 and 106 are transmitted from central control circuit 120 via sinal distributor 112 and communication lines 134. Further, scanner signals received from the trunk interface circuits 105 and 106 are applied to central control circuit 120 via scanner circuit 113 and communication lines 135 as shown in FIG. 1.

Figure 2:
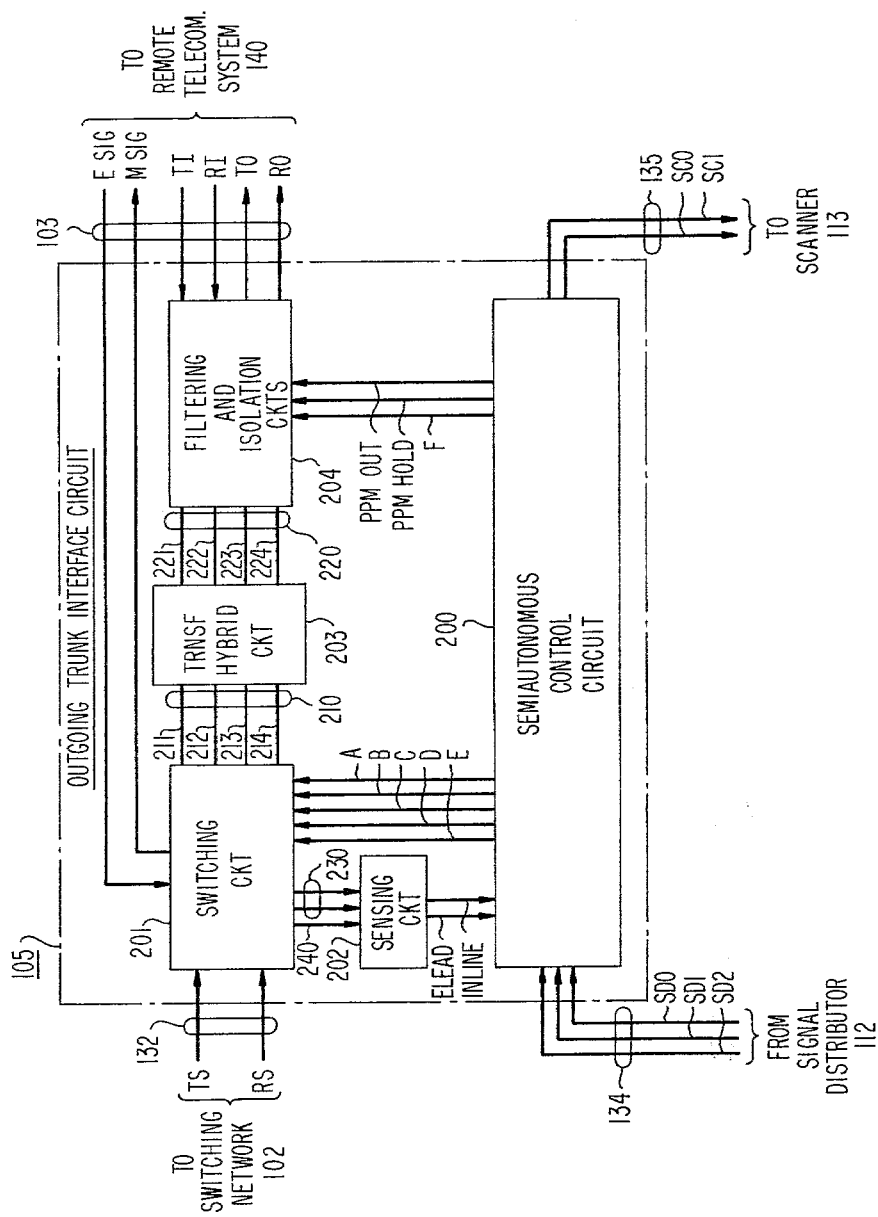
FIG. 2 is a block diagram of one illustrative embodiment of a trunk interface circuit in accordance with the invention.

A functional block diagram of an illustrative embodiment of an outgoing trunk interface circuit 105, in accordance with the invention, is shown in FIG. 2. When one of subscriber stations 109 originates a telephone call to a subscriber station 141 associated with remote telecommunication system 140, the outgoing trunk interface circuit 105 selectively establishes various electrical path configurations between line 132 connected to network 102 and the trunk transmission facility 103 during the stages of the call (e.g., signaling, talking, etc.). These paths are formed by selective operation of circuitry within the switching circuit 201 which may comprise any well-known controlled switching mechanism, such as relay circuitry.

Additional functions of outgoing trunk interface circuit 105 in accordance with the invention are associated with a signaling format utilized in several countries for purposes of call charging known as "periodic pulse metering" (PPM). In that scheme, the charge for a call is computed at the originating office on the basis of periodic pulses which have been generated from the distant office at a frequency which is directly related to the charge per unit time. In the United States, a common process of charging for interoffice calls is to record information regarding the call, e.g., call duration, subscriber station directory numbers, call class, etc., on a magnetic tape or similar recording device at the originating office. This information is subsequently processed at a telephone company accounting office to determine specific billing charges. This process of charging is known as automatic message accounting (AMA) and is well known in the art. However, in other countries utilizing periodic pulse metering, it is required that charging information be processed and billing costs computed within the originating office at the time the call is made. The periodic pulse metering system may be illustrated by assuming a simple interoffice call comprising a connection from an originating office to any distant office via an outgoing trunk interface circuit. The distant office will maintain information which can be used to determine the "call rating", i.e., the charging rate, given the knowledge of the specific trunk being utilized or the directory number of the called subscriber station. The distant office will generate periodic charging pulses and transmit these pulses to the originating telecommunication system via the connecting trunk. Each pulse corresponds to a specific monetary charge for the call and the duration of time between pulses is determined by the charging rate for the specific call. The originating office must then determine the total charge for the call by counting the number of periodic pulses received during the call duration.

The originating office receiving the periodic pulses will usually maintain cumulative counters for each directory number of its associated subscriber stations. These counters serve as a primary source of billing information for the telephone company. Another aspect of a periodic pulse metering system is the requirement that the originating office receiving the periodic pulses be capable of regenerating the pulses toward the originating subscriber station directly upon receipt from the distant office if the calling subscriber station is equipped with a customer premise meter or a coin phone, each of which is well known in the telephone art. This process is known as "line side" regeneration and is used to peg the customer premise meter or to inform the coin subscriber station that another unit of charge is to be levied. Even when the calling subscriber station is equipped with a customer premise meter the associated telecommunication system must still continue to record all charges for billing purposes; the customer premise meter is for subscriber station use only and is not used by the telephone company for accounting purposes.

With electronic stored program controlled telecommunication systems, a simulated form of periodic pulse metering may be used since these telecommunication systems have the capability to "rate" an interoffice call on the basis of the calling or called subscriber station directory numbers. However, even with simulated periodic pulse metering, it is necessary to provide generation of periodic pulses toward the calling subscriber station when the station is equipped with a customer premise meter or the subscriber station is a coin phone. The specific processes of periodic pulse metering and line-side regeneration as provided by outgoing trunk interface circuit 105 are described in subsequent paragraphs herein.

As depicted in FIG. 2, outgoing trunk interface circuit 105 comprises a semiautonomous control circuit 200, a switching circuit 201, sensing circuitry 202, a transformer hybrid circuit 203, filtering and isolation circuits 204, and various interconnections among these circuits. Communication line 132 is a bidirectional communication line and comprises a pair of conductors TS and RS as shown in FIG. 2 which carry communication signals to and from the calling subscriber station and service circuits 104 through switching network 102. Conductors TS and RS are connected to switching circuit 201 which comprise switching means such as relay circuits for establishing various electrical path configurations between communication line 132 and conductors which carry voice and information signals to and from the remote telecommunication system 140 via transmission facility 103 as shown in FIG. 2.

The "state" of trunk interface circuit 105 is defined in part by the values of the binary signals on communication line 134 from signal distributor 112. These signals are defined as "state signals" and are applied to trunk interface circuit 105 from the central control circuit 120 via the peripheral unit bus 114 and signal distributor 112 previously described with respect to FIG. 1. In the illustrative embodiment shown in FIG. 2, communication line 134 comprises three parallel conductors and the state signals comprise three binary signals SD0, SD1, and SD2. These state signals are directly applied to semiautonomous control circuit 200 as shown in FIG. 2. The semiautonomous control circuit 200 is responsive to the state signals applied on communication line 134 for executing sequences of control functions which perform various operations relating to trunk interface circuit 105. As will be subsequently described herein, the specific sequences of control functions which will be executed in response to a given set of state signals is dependent not only upon the present values of the state signals but also upon the previous values of these signals which have been stored in memory within the control circuit 200. By utilizing this type of control, the control functions are not limited to a maximum of eight distinct sequences, i.e., $2^3$ wherein there are three binary state signals.

One of the functions of semiautonomous control circuit 200 is to operate the relay circuitry within switching circuit 201 shown in FIG. 2. This circuitry is operated by means of the generation of switch control signals on conductors A through E which are applied to switching circuit 201 as shown in FIG. 2. Specific detail as to the relay circuitry operated via these conductors is described in subsequent paragraphs with respect to FIG. 2. At the outgoing side of trunk interface circuit 105, trunk transmission facility 103 comprises two pairs of voice communication conductors, incoming voice communication conductors TI and RI and outgoing voice communication conductors TO and RO. Two other circuit elements are utilized in the voice communication path between switching network 102 and the voice communication conductors of transmission facility 103. Switching circuit 201 is connected to a transformer and hybrid circuit 203 by means of a communication line 210 which comprises four conductors 211 through 214 as shown in FIG. 2. Transformer and hybrid circuit 203 comprises circuitry for establishing a fixed balance network in relation to voice signals and impedances on the various communication lines and provides transformation of unidirectional communication on transmission facility 103 to a bidirectional format, known as "4-wire to 2-wire" conversion. This circuitry is well known in the prior art. The transformer and hybrid circuit 203 is connected to filtering and isolation circuits 204 as shown in FIG. 2 by means of communication line 220 which comprises four conductors 221 through 224. The filtering and isolation circuits 204 are used to establish high quality voice communication between subscriber stations and, as will be further described in subsequent paragraphs, provide various functions associated with the previously described periodic pulse metering charging system. The filtering and isolation circuits 204 are directly connected to the voice communication paths of transmission facility 103 as shown in FIG. 2.

Signaling between the various circuitry of trunk interface circuit 105 and the remote telecommunication system 140 is established via the ESIG and MSIG conductors of trunk transmission facility 103 shown in FIG. 2. The MSIG conductor is used to transmit to the remote telecommunication system 140 outgoing information signals which are established by means of operating relay circuitry within switching circuit 201. This outgoing signaling function will be further described in subsequent paragraphs. Incoming informtion signals are received from remote telecommunication system 140 via the ESIG conductor of trunk transmission facility 103. These incoming signals comprise not only various status signals associated with standard trunk interconnection functions but also comprise pulses associated with the periodic pulse metering system. These signals are applied to switching circuit 201 as shown in FIG. 2, and by means of relay circuitry therein may be directly applied to sensing circuit 202 via conductor 240. Corresponding signals are then applied to semiautonomous control circuit 200 via conductor ELEAD.

Information as to the status of certain of the communication paths with switching circuit 201 also may be transmitted to semiautonomous circuit 200. These status signals are directly applied to sensing circuit 202 from switching circuit 201 via communication line 230 comprising a pair of conductors as shown in FIG. 2. The sensing circuit 202 then applies a corresponding status signal directly to semiautonomous control circuit 200 via conductor INLINE as shown in FIG. 2.

Various signals associated with the PPM charging system are applied to filtering and isolation circuits 204 from semiautonomous control circuit 200 via conductors PPM OUT, PPM HOLD, and F as shown in FIG. 2. These signals are utilized when charging signals must be regenerated to an originating subscriber station and will be further described in detail in subsequent paragraphs relating to the PPM charging system.

As previously described with respect to FIG. 1, signals are applied to central control circuit 120 from outgoing trunk interface circuit 105 via communication line 135, scanner circuit 113, and peripheral unit bus 114. Communication line 135 comprises a pair of conductors connected directly to semiautonomous control circuit 200. Control circuit 200 generates a pair of binary signals denoted as scanner signals SC0 and SC1 as shown in FIG. 2. Scanner signals SC0 and SC1 comprise information regarding the status of a telephone call utilizing interface circuit 105 and also comprise PPM charging information.

Figure 3:
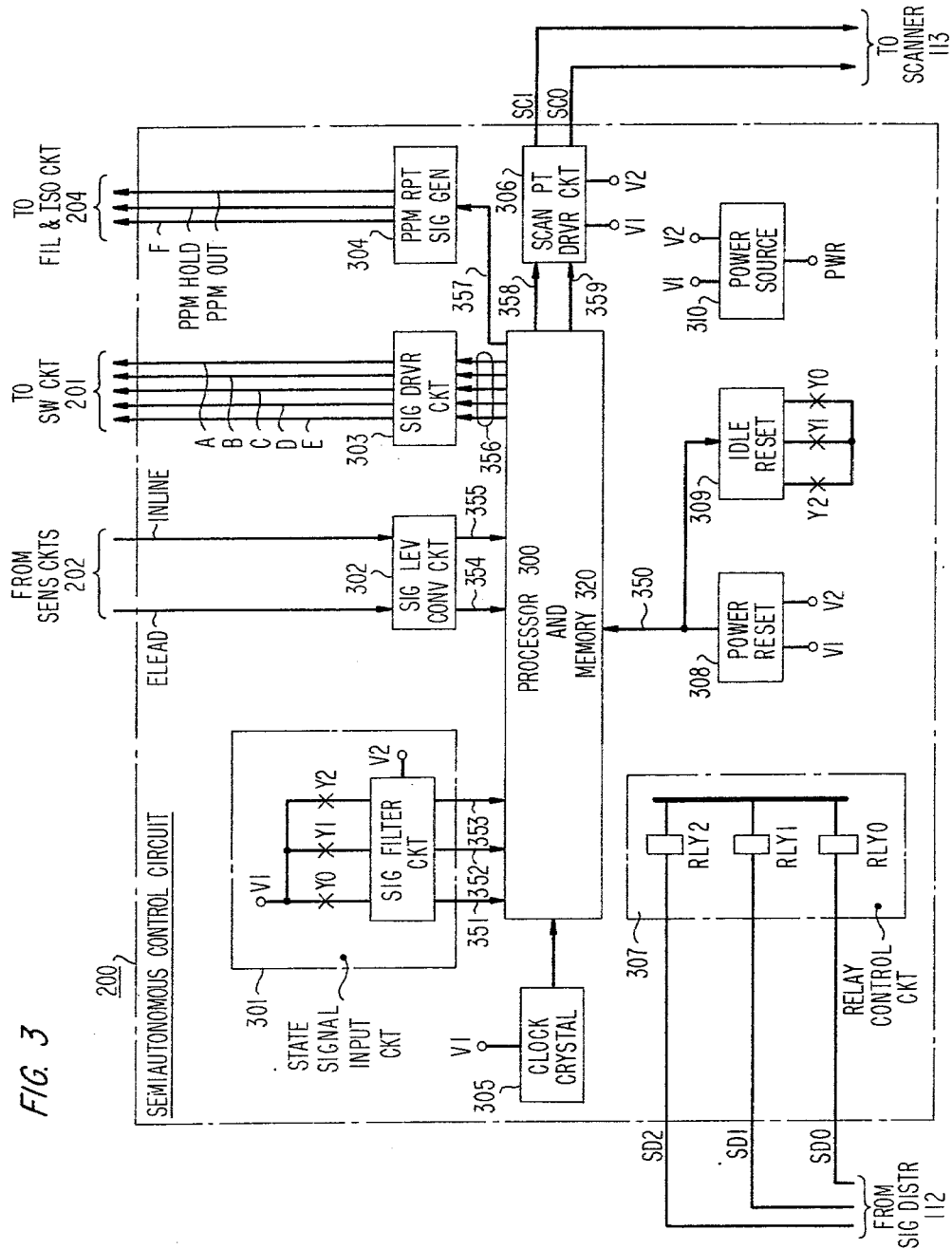
FIG. 3 is a detailed diagram of the semiautonomous control circuit of the trunk interface circuit of FIG. 2.

FIG. 3 is a more detailed diagram of the semiautonomous control circuit 200 in accordance with the invention as shown in FIG. 2. The state signals SD0 through SD2 previously described with respect to FIG. 2 are directly applied to relay control circuit 307 as shown in FIG. 3. For purpose of description, each of binary state signals SD0 through SD2 will be defined as having a "high" state corresponding to a binary "1" and a "low" state corresponding to a binary "0". Relay control circuit 307 is well known in the art and comprises three magnetic latching relay circuits RLY0, RLY1, and RLY2. When state signal SD0 is in a low state, magnetic latching relay circuit RLY0 is defined as being "released" and all corresponding relay contact points Y0 will be in the "normal" state. When signal SD0 is in a high state, magnetic latching relay circuit RLY0 is defined as being "operated" and all corresponding relay contact points Y0 will be in the "operated" state. The symbol "/" at a relay contact point Y0 across a particular conductor designates that the contact point Y0 is "normally closed", i.e., forms a continuous conducting path when magnetic latching relay RLY0 is in the released state, and an open path when RLY0 is in the operated state. The symbol "X" at a relay contact point Y0 across a particular conductor designates that the contact point Y0 is "normally open", i.e., forms an open path when RLY0 is in the released state and a continuous conducting path when RLY0 is in the operated state. Magnetic latching relays RLY1 and RLY2, relay contact points Y1 and Y2, and respective state signals SD1 and SD2 perform in an identical manner as described above with respect to latching relay RLY0, relay contact points Y0, and state signal SD0.

Power to the various circuitry within trunk interface circuit 105 is supplied via a power source circuit 310 connected to an independent power supply terminal labeled "PWR" and shown in FIG. 3. Switches within circuit 310 selectively supply power to terminals V1 and V2. In an exemplary embodiment of trunk interface circuit 105 in accordance with the invention, voltages at terminals V1 and V2 are +5 volts and a ground voltage, respectively. The semiautonomous control circuit 200 comprises a processor 300 and a memory 320 as shown in FIG. 3. Timing of instruction execution within processor 300 is controlled by input signals generated from clock circuit 305. Circuit 305 may be any of the numerous processor control clock circuits well known in the art. The processor 300 may be functionally initialized in one of two ways. Power reset circuit 308 comprises circuitry which initializes processor 300 by directly applying a reset signal on conductor 350 when power is first established at terminals V1 and V2. Similarly, when each of state signals SD0 through SD2 is established in the low state, idle reset circuit 309 and the associated relay contact points Y0 through Y2 shown in FIG. 3 also operate to apply a reset signal to processor 300 via conductor 350. Each of reset circuits 308 and 309 is well known in the art.

The state signals SD0 through SD2 are indirectly utilized to apply input signals to processor 300 for controlling execution of functions within the processor via state signal input circuit 301 and its associated relay contact points Y0 through Y2 shown in FIG. 3. State signal input circuit 301 provides circuitry for establishing signal levels and impedance compatibility with the internal circuits of processor 300 and is well known in the prior art. Further, input circuit 301 provides filtering circuitry to prevent possible "contact bounce" from being detected by the processor internal circuitry. A high state signal SD0 will cause the relay contact point Y0 connected to state signal input circuit 301 to operate and a high signal will be applied to processor 300 via conductor 351 as shown in FIG. 3. Similarly, if signal SD0 is in a low state, the signal applied to processor 300 via conductor 351 will also be in a low state. In an identical manner, input signals corresponding to signals SD1 and SD2 will also be applied to processor 300 on conductors 352 and 353, respectively, as shown in FIG. 3. These signals on conductors 351 through 353 are the control signals which define the internal state of processor 300 and provide input information from the system control circuit 110 shown in FIG. 1 as to the control functions which are to be executed.

As shown in FIG. 3, the ELEAD and INLINE conductors from switching circuit 202 are applied as input signals to signal level conversion circuit 302. This circuit is well known in the art and provides voltage level conversion of the input signals for compatibility with the internal circuitry of processor 300. The compatible signals corresponding to the signals on the ELEAD and INLINE conductors are applied to processor 300 via conductors 354 and 355, respectively. As previously described with respect to FIG. 2, the switch control signals on conductors A through E, also shown in FIG. 3, operate relays within switching circuit 201. These signals are generated by relay signal conversion circuit 303 in response to corresponding switch control signals generated by processor 300 on the plurality of conductors comprising output communication line 356 as shown in FIG. 3. The corresponding switch control signals on communication line 356 are applied to signal driver circuit 303 which provides amplification of drive current for subsequent operation of the relay circuitry of switching circuit 201 via the switch control signals on conductors A through E.

The PPM repeater signal generation circuit 304 provides signals utilized with the periodic pulse metering system when charging pulses must be regenerated to the calling subscriber station as described in previous paragraphs. When the regeneration function is required, a signal is generated on conductor 357 by processor 300, and is applied as an input signal to repeater generation circuit 304 as shown in FIG. 3. In response to this input signal, repeater generation circuit 304 generates signals on each of conductors F, PPM HOLD, and PPM OUT. Each signal is then applied to filtering and isolation circuit 204. The signal on PPM OUT comprises a square wave having a frequency equal to the frequency of pulses which are to be applied to the calling subscriber station. The signal on conductor PPM HOLD is an enabling signal for circuitry within the filtering and isolation circuits 204 which is utilized with the periodic pulse metering repeater function. The signal on conductor F provides a high frequency tone to the calling subscriber station on which the PPM charging pulses are carried. The utilization of these output signals and repeater generation circuit 304 are well known in the art.

As previously described, semiautonomous control circuit 200 transmits scanner signals SC0 and SC1 to the central control circuit 110 via scanner circuit 113. Corresponding signals are generated by processor 300 on conductors 358 and 359 as shown in FIG. 3. Each of these signals is applied as an input signal to scan point driver circit 306 which provides signal compatibility with circuitry of the system control circuit 110. Scan point driver circuit 306 generates corresponding scanner signals SC0 and SC1 which are transmitted to scanner circuit 113 as shown in FIG. 3. Signals SC0 and SC1 may comprise information regarding the configuration status of outgoing trunk interface circuit 105 or they may comprise data corresponding to the PPM charging pulses which have been received from remote telecommunication system 140 during an interoffice call.

Figure 4:
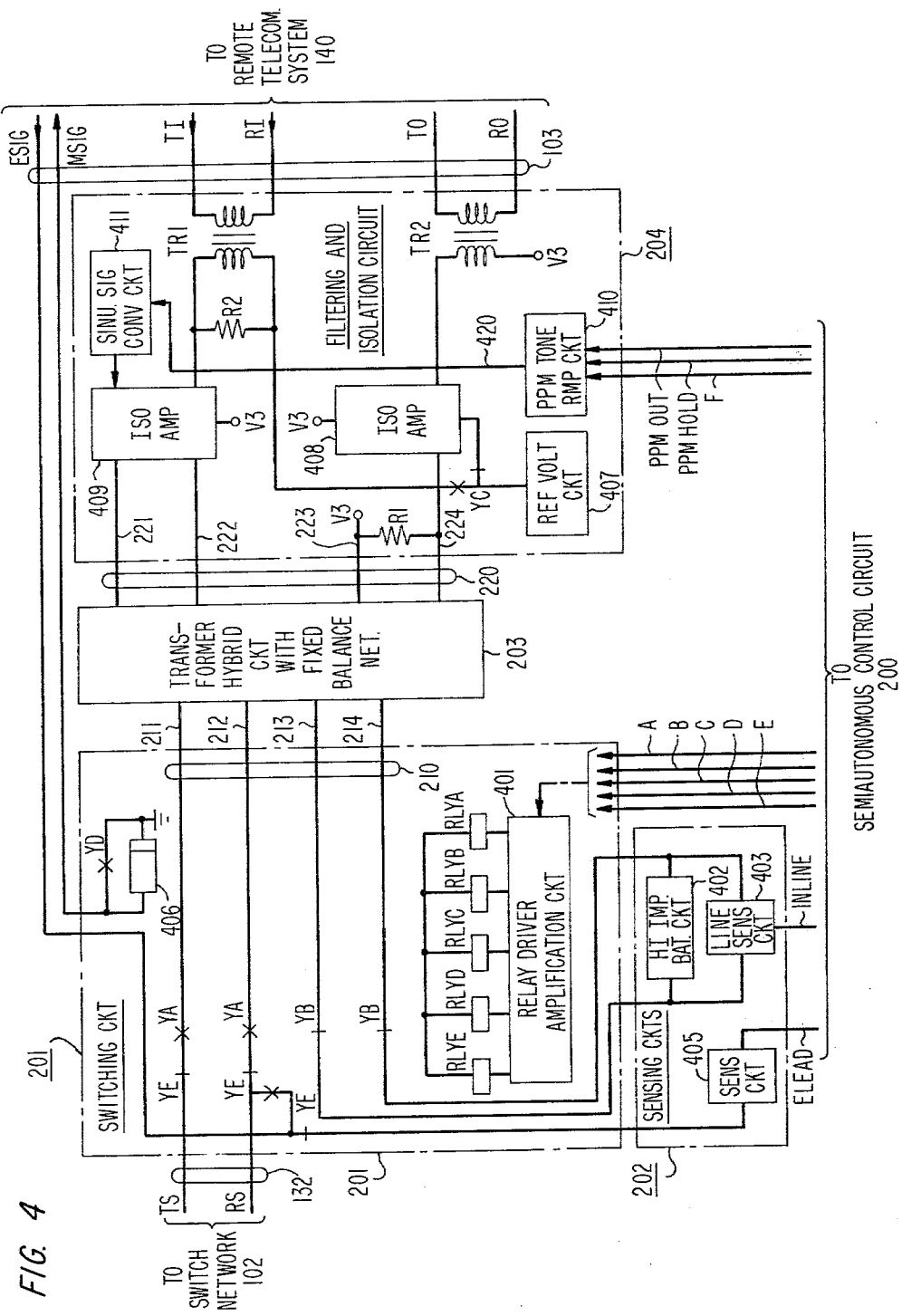
FIG. 4 is a detailed diagram of the switching and sensing circuitry of the trunk interface circuit of FIG. 2.

FIG. 4 is a detailed diagram of switching circuit 201, sensing circuitry 202, filtering and isolation circuit 204, and interconnection of these circuits with hybrid circuit 203. As previously described with respect to FIG. 2, switch control signals from semiautonomous control circuit 200 are applied to switching circuit 201 via conductors A through E. Each of these switch control signals is applied to relay driver amplification circuit 401 and controls a corresponding one of magnetic latching relays RLYA through RLYE as shown in FIG. 4. The control and operation of these relays is identical in function to that of relays RLY0 through RLY2 described with respect to FIG. 2, i.e., a high state switch control signal on conductor A will cause the corresponding point RLYA to operate, thereby effecting all relay contact points YA shown in FIG. 4. Identical relay operation occurs for magnetic latching relays RLYB through RLYE and relay contact points YB through YE, respectively.

The relays YA through YE provide the switching necessary to configure selective communication and signaling paths among switching network 102, semiautonomous control circuit 200, and the remote telecommunication system 140 during the various stages of an interoffice call originating from one of subscriber stations 109 shown in FIG. 1. Each of relays RLYA through RLYC is utilized to provide configuration of communication paths between the TS and RS conductors connected to switching network 102 and the voice receiving and transmitting portions of trunk transmission facility 103, i.e., conductors TI, RI, and TO, RO, respectively. Specifically, with relay RLYA operated, a redirect communication path is established between conductors TS, RS and conductors 211, 212, respectively. Within hybrid circuit 203, conductors 211 and 212 are further connected in voice communication paths to conductors 221 through 224.

When relay RLYB is released, an electrical path is established from the hybrid circuit 203 to the high impedance battery circuit 402 and line sense circuit 403 via conductors 213 and 214 as shown in FIG. 4. The signals on conductors 213 and 214 monitor current flow on the voice communication paths 211 and 212 within hybrid circuit 203. The internal circuit structure of hybrid circuit 203 is well known in the art and is therefore not depicted in the drawing herein. The high impedance battery circuit 402 is a protection device to prevent noise signals on the voice communication paths when RLYB is operated or released. The signals on conductors 213 and 214 are applied as input signals to line sense circuit 403 which generates a corresponding binary signal on conductor INLINE when voice current has been established on conductors 211 and 212.

Magnetic latching relay RLYC controls relay contact point YC in filtering and isolation circuits 204 as shown in FIG. 4. Filtering and isolation circuits 204 comprises transformers TR1 and TR2 connected across receiving conductors TI and RI and transmitting conductors TO and RO, respectively, of trunk transmission facility 103. Filtering and isolaion circuits 204 further comprises a reference voltage circuit 404 which generates a voltage V3 utilized for purposes of establishing voice signal transmission and reception. When relay RLYC is operated, voltage V3 is applied to one side of transformer TR1, thereby allowing single-ended operation of the receiving portion TI and RI of trunk transmission facility 103. Further, the isolation amplifiers 408 and 409 shown in FIG. 4 are activated and bidirectional voice communication is established from transmission facility 103 to conductors 211 and 212 through hybrid circuit 203. With relay RLYC released, termination resistors R1 and R2 are electrically connected across transmitting and receiving conductors TO, RO and TI, RI, respectively, and trunk interface circuit 105 is denoted as having an "idle circuit termination" appearance with respect to transmission facility 103. The concept of "idle circuit termination" appearances is well known in the art of trunk circuit design. The structure of filtering and isolation circuits 204 comprising the reference voltage circuit 407, isolation amplifiers 408 and 409 and termination resistors R1 and R2 is well known in the art.

Relay RLYE functions to selectively establish a communication path for receiving information signals from the remote telecommunication system 140 via transmission facility 103. When relay RLYE is in the normal state, relay contact points YE in switching circuit 201 provide a common path for applying signals from the ESIG receiving conductor of trunk transmission facility 103 to trunk sense circuit 405 as shown in FIG. 4. Correspondingly, sense circuit 405 generates a signal on conductor ELEAD which is applied to semiautonomous control circuit 200 as previously described with respect to FIG. 3. When RLYE is operated, signals on receiving conductor ESIG are applied toward switching network 102 on the conductor RS. Magnetic latching relay RLYD is utilized to apply outgoing information signals on the transmitting conductor MSIG of trunk transmission facility 103. As shown in FIG. 4, the MSIG conductor is connected through a normally released relay contact point YD to ground. Protection circuit 406 is an RC filtering circuit well known in the art and is connected across relay contact point YD to prohibit harm to the contact point in the presence of voltage surges on the MSIG conductor. The resultant signal transmitted on the MSIG conductor is a ground voltage level when relay RLYD is operated and a differing voltage level dependent on the parameters of elements of protection circuit 406 when relay RLYD is released.

As previously described with respect to FIG. 3, a signal applied to PPM repeater generation circuit 304 causes certain signals to be generated on conductors F, PPM HOLD, and PPM OUT. Each of these signals is applied to PPM tone ramping circuit 410 as depicted in FIG. 4. Tone ramping circuit 410 generates a repeater tone which is applied to sinusoidal signal conversion circuit 411. Conversion circuit 411 generates a sinusoidal tone signal which is compatible with the signal levels and frequencies utilized in telecommunication system 100 for voice communication. The sinusoidal tone signal is applied to isolation amplifier 409 which then generates an amplified PPM tone signal which may be carried as a modulated signal toward the calling subscriber station via conductors 221 and 222. The design of PPM circuitry such as ramping circuit 410 and conversion circuit 411 is well known in the art and parameters of elements within these circuits may be adjusted in accordance with the particular signaling formats utilized by telecommunication system 100 and the subscriber stations 109 connected thereto.

The relay controlled operation of outgoing trunk interface circuits having switching and isolation and filtering circuits similar in design to that of switching circuit 201 and filtering circuits 204 are well known in the art. Detailed descriptions of the switching operations of these trunk interface circuits are described in the aforementioned *Bell System Technical Journal* and in U.S. Pat. No. 3,336,442, R. C. Casterline et al.

Figure 5:
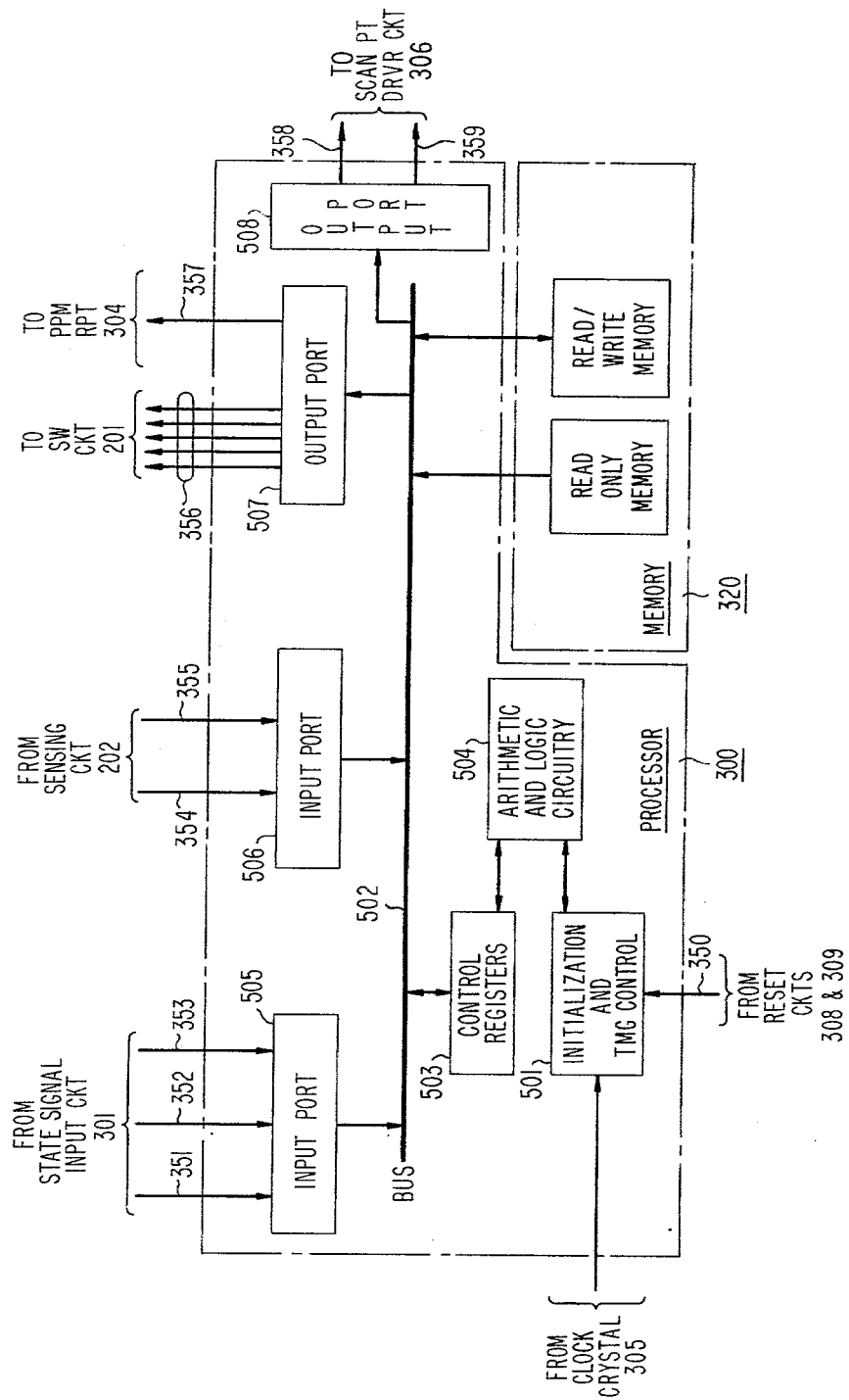
FIG. 5 illustrates the internal circuitry of the processor and memory of the semiautonomous control circuit depicted in FIG. 3.

As described with respect to FIG. 3, the semiautonomous control circuit 200 comprises a processor 300 and a memory 320. Processor 300 may be any commercially available processor having sufficient operating speed and capacity to execute program instructions and input-/output functions of the type necessary to control the trunk interface circuit 105 described herein. For example, a microprocessor and memory system of the type depicted in FIG. 5 may be utilized. One arrangement of this type is the Intel MCS-8048 System which is well known in the art and generally described in the *MCS-48 TM User's Manual*, Intel Corporation, 1978. As shown in FIG. 5, processor 300 comprises initialization and timing control circuit 501 which utilizes input signals from the previously described clock circuit 305 and reset circuits 308 and 309 to provide instruction sequence timing for processor 300 and memory 320. Data is transmitted among the various circuits of processor 300 via the common bus 502 shown in FIG. 5. For example, stored program instructions are transmitted from memory 320 to control registers 503 via bus 502. Control registers 503 comprise various register circuits well known in the art of processor design, e.g., address and instruction decoder registers. Arithmetic and logic circuitry 504 is controlled by timing circuit 501 and executes various arithmetic and Boolean logic operations as determined by the program instructions transmitted from control registers 503. Processor 300 further comprises input ports 505 and 506, and output ports 507 and 508 for receiving and transmitting external signals, respectively. The state signals SD0 through SD2 are indirectly applied to input port 505 on conductors 351 through 353 via the state signal input carrier 301, previously described with respect to FIG. 3. Arithmetic and logic circuitry 504 may then "read" these state signals via bus 502 and control registers 503. Similarly, the signals received on conductors ELEAD and INLINE from sensing circuitry 202 are indirectly applied, through the previously described signal level conversion circuit 302, to input port 506 on conductors 354 and 355. These signals may also be read by arithmetic and logic circuitry 504.

As further shown in FIG. 5, output port 507 is utilized to transmit data signals to switching circuit 201 and to PPM repeater circuit 304. Specifically, the signals transmitted on the five conductors comprising communication line 356 are the relay control signals which are applied on conductors A through E through signal driver circuit 303, previously described with respect to FIGS. 3 and 4. The signal transmitted through output port 507 on conductor 357 is the PPM tone signal which is applied to PPM repeater circuit 304, thereby causing PPM charging signals to be repeated to the calling subscriber station 109 as previously described. Output port 508 is utilized to transmit scanner signals on conductors 358 and 359. Each of the scanner signals is applied to scan point driver circuit 306 as previously described with respect to FIG. 3. The resultant scanner signal SC1 corresponds to the transmitted signal on conductor 358 while resultant scanner signal SC0 corresponds to the transmitted signal on conductor 359.

The memory 320 comprises individually addressable memory locations, each having a plurality of bits of binary information. As shown in FIG. 5, certain of the memory locations comprise a "read/write" memory wherein data words may be stored and modified during operation of semiautonomous control circuit 200. Other memory locations may comprise a "read-only" memory for storing both program instructions and data words which are to remain constant during circuit operation. All word locations of memory 320 are accessible to circuitry of processor 300 via bus 502. The design and concepts of read-only and read/write memories for use with processors are well known in the art and the requisite sizes of the memories are dependent on the design and complexity of the trunk interface circuit functions and the particular instruction sequences utilized. In the aforementioned Intel MCS-8048 System, the read-only and read/write memories may comprise up to 4096 and 384 memory words, respectively, with each word comprising eight bits of data.

Outgoing trunk interface circuit 105 is defined as having a plurality of "states". During the stages of an interoffice call, the trunk interface circuit will sequentially change to various of these states, and selective control functions relating to trunk circuit operations will be performed via instruction sequences executed via processor 300. The particular state of the trunk interface circuit at any given time is defined by the present values of state signals SD0 through SD2 and by the state signals which were modified when changing from the immediately prior state to the present state of trunk interface circuit 105. In the illustrative embodiment of trunk interface circuit 105 in accordance with the invention described herein, only one of state signals SD0 through SD2 is modified when sequentially changing from one state to another. This type of state signal operation is defined as a Gray code sequence and is well known in the art and described in F. Gray, U.S. Pat. No. 2,632,058. For descriptive purposes, each of state signals SD0 through SD2 and other binary signals described herein will be defined as having a binary value of "0" when in the low state and a binary value of "1" when in the high state.

Figure 6:
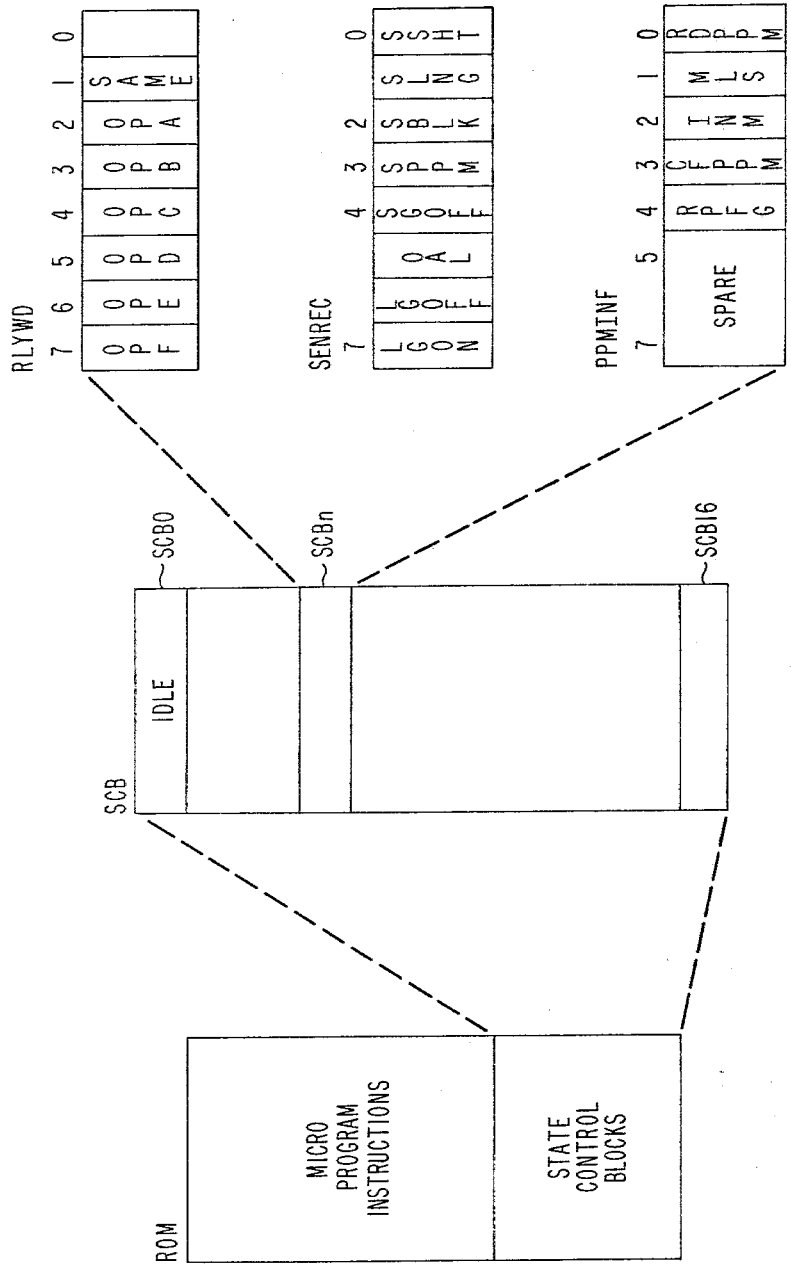
FIG. 6 depicts a layout of memory word locations and data bits therein of the read-only portion of the memory depicted in FIG. 5.
Figure 7:
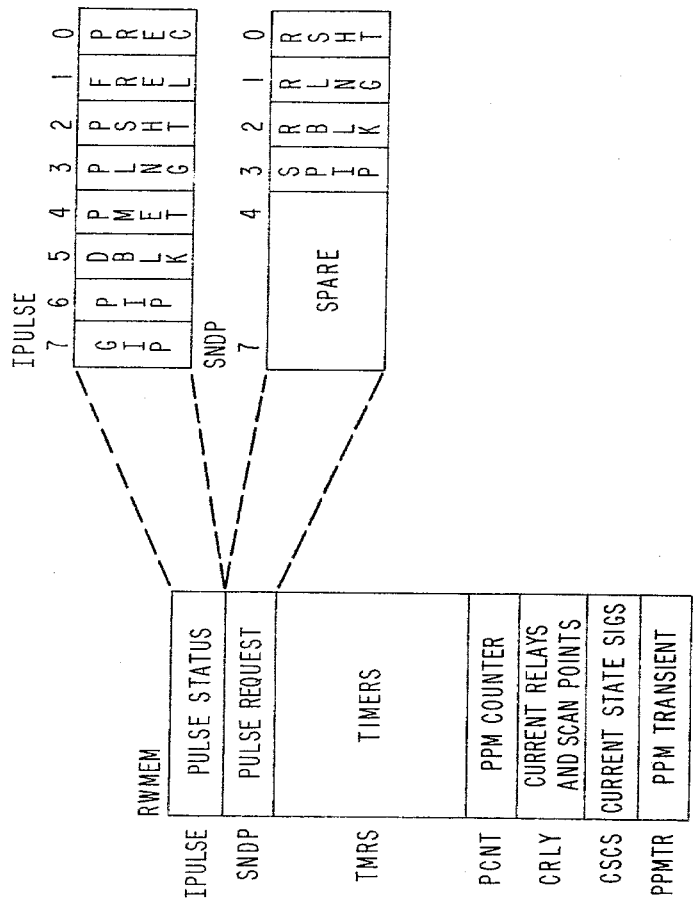
FIG. 7 depicts a layout of memory word locations and data bits therein of the read/write portion of the memory depicted in FIG. 5.
Figure 8:
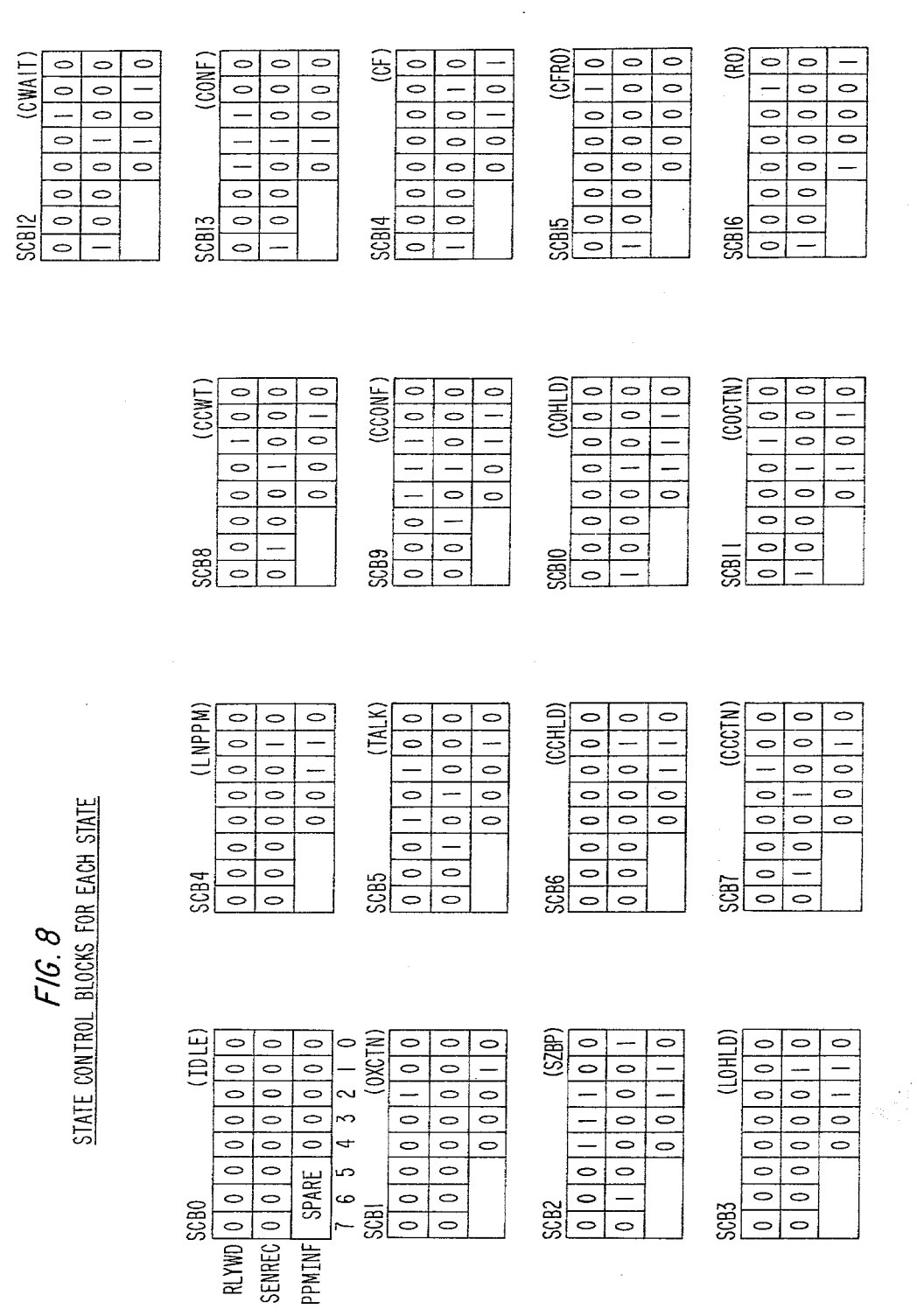

An exemplary structure of word locations of memory 320 and the data bits stored therein for the illustrative embodiment of trunk interface circuit 105 in accordance with the invention is depicted in FIGS. 6 through 8 of the drawing. FIG. 6 depicts the structure of memory locations within the read-only portion of memory 320 shown in FIG. 5, and is labeled "ROM". This memory need not have "read-only" characteristics and may comprise a writable structure. However, if the information stored in the memory is not to be modified during operation of the trunk interface circuit, a read only structure is advantageous in design, reliability, and cost. The read only memory shown in FIG. 6 comprises two portions, one having stored therein instructions for execution via processor 300 and the other having data word modules defined as "state control blocks". Each state control block comprises a set of memory locations having data words uniquely corresponding to one of the states of trunk interface circuit 105. The data bits within a state control block are accessed and utilized by the instructions to determine the specific trunk circuit functions to be performed.

As shown in FIG. 6, each state control block comprises three data words for the illustrative embodiment described herein. The number of words required for other embodiments of a trunk interface circuit in accordance with the invention is dependent on the instruction sequences utilized and the complexity of the switching and signaling operations performed for each state of the particular trunk interface circuit. The individual bits of the data words of the state control blocks shown in FIG. 6 will be described in subsequent paragraphs herein.

As previously described, each state of the trunk interface circuit 105 is defined by a unique combination of state signals SD0 through SD2 and a particular state signal modified during the change from the prior state to the present state. Table 1, shown below, lists the states of trunk interface circuit 105, the names of the corresponding state control blocks in the read-only memory, and the name of the next state for each state signal which may be changed. An "*" indicates that a change of the particular state signal is not allowed in this embodiment and would be considered an error during operation.

For purposes of initilization of the interface circuit, when each of the state signals has a binary value of 0, i.e., is in the low state, the trunk interface circuit 105 is in the "IDLE" state regardless of the prior values of the state control signals.

The IDLE state is utilized to initialize the trunk interface circuit 105. For each state of the trunk interface circuit 105, a sequence of control functions is executed by the processor 300. The specific sequence of functions to be performed for a particular state is defined by data words stored prior to initial operation of the interface circuit 105 in the state control block corresponding to that particular state.

TABLE 1

STATE CONTROL MAP

| STATE NAME | ASSOCIATED STATE CONTROL BLOCK | NEXT STATE FOR CHANGE OF EACH STATE CONTROL SIGNAL | | |
|---|---|---|---|---|
| | | SC2 | SC1 | SC0 |
| IDLE | SCB0 | * | * | OXCTN |
| OXCTN | SCB1 | SZBP | * | IDLE |
| SZBP | SCB2 | LOHLD | CCHLD | CF |
| LOHLD | SCB3 | TALK | LNPPM | * |
| LNPPM | SCB4 | * | LOHLD | * |
| TALK | SCB5 | LOHLD | COHLD | CF |
| CCHLD | SCB6 | CCCTN | * | * |
| CCTN | SCB7 | * | CCWT | * |
| CCWT | SCB8 | CCONF | * | * |
| CCONF | SCB9 | * | COHLD | CF |
| COHLD | SCB10 | COCTN | TALK | * |
| COCTN | SCB11 | COHLD | * | CWAIT |
| CWAIT | SCB12 | CONF | * | * |
| CONF | SCB13 | * | CF | COHLD |
| CF | SCB14 | IDLE | CFRO | * |
| CFRO | SCB15 | RO | CF | * |
| RO | SCB16 | CFRO | IDLE | * |

For the illustrative embodiment of interface circuit 105 described herein in accordance with the invention, there are 17 states as shown in Table 1 above and 17 corresponding state control blocks also shown in Table 1 and structurally depicted in FIG. 6 of the drawing. As previously described, each state control block comprises three memory words, with each word having eight bits of binary data. For purposes of description, the data bits in each words are numbered from zero through 7 as depicted in the drawing. The first memory location of each state control block is defined as word RLYWD. The data bits within this location describe the particular switch control signals which are to be applied to conductors A through E as shown in FIG. 4 and the signal which is to be applied to the PPM repeater generation circuit 304 shown in FIG. 3. Table 2, shown below, lists the bit numbers, names, and corresponding functions when each bit is in a high state. The bit names are also shown in the memory layout of FIG. 6. As shown below, bit 1 is a "shorthand" notation for describing that the signals to be applied to conductors A through E and to repeater circuit 304 are to be the same as those applied for the previous state. Bits 2 through 6 specifically define the relay control signal configuration for this particular state and bit 7 defines whether a signal is to be sent to the repeater generation circuit 304.

TABLE 2

RLYWD DATA

| BIT NO. | NAME | FUNCTION |
|---|---|---|
| 0 | | Spare |
| 1 | SAME | Same configuration as prior state |
| 2 | OPA | Operate YA relay |
| 3 | OPB | Operate YB relay |
| 4 | OPC | Operate YC relay |
| 5 | OPD | Operate YD relay |
| 6 | OPE | Operate YE relay |
| 7 | OPF | Send to PPM circuit 304 |

The second location of each control block, entitled SENREC as shown in FIG. 6, defines the types of signals, i.e., durations of pulses, which are to be sent to the remote telecommunication system 140 and the scan point signals SC0 and SC1 to be transmitted to central control circuit 120. Table 3 below lists the specific functions to be performed when a particular bit of location SENREC is in the high state. Bits 0 through 2 define the type of pulse to be sent to the remote telecommunication system 140 via transmitting path MSIG in this particular state. Bit 3 defines any pulse received from the remote telecommunication system 140 in the form of a "short" pulse as to be considered a PPM charging pulse. Bits 4 through 7 define the particular scanner signal SC1 to be sent to central control circuit 120. For purposes of description, a binary signal in the high state is defined as being an "off-hook" signal, while a binary signal in the low state is defined as an "on-hook" signal. The concept of "short" pulses and "long" pulses is well known in the art of trunk circuit design and the durations of the pulses defined as either short or long is dependent upon the particular telecommunication system being utilized. For example, in many telecommunication systems, a "short" pulse is defined as a pulse of approximately 30 milliseconds, while a "long" pulse may be defined as having a time length of 120 milliseconds. The concept of "blocking" signals is also well known in the art and consists of a constant signal level being transmitted either to or from the remote telecommunication system 140. It should be noted that all signals being transmitted to circuitry external to trunk interface circuit 105 are signals which are well known in the art and are the types of signals which are required regardless of the particular trunk circuit being utilized.

TABLE 3

| BIT NO. | NAME | FUNCTION |
|---|---|---|
| | | SENREC DATA |
| 0 | SSHT | Send short pulse on MSIG |
| 1 | SLNG | Send long pulse on MSIG |
| 2 | SBLK | Send blocking pulse on MSIG |
| 3 | SPPM | Short pulse received is PPM pulse |
| 4 | SGOF | If received pulse is short, send off-hook on SC1 |
| 5 | OAL | Send 1-second off-hook, then on-hook on SC1 |
| 6 | LGOFF | Send off-hook if long pulse received |
| 7 | LGON | Send on-hook if long pulse received |

The third memory location of each state control block is named PPMINF, and is also shown in FIG. 6. PPMINF defines information regarding functions relating to the periodic pulse metering (PPM) system. Table 4, shown below, lists each of the bits utilized within location PPMINF and their corresponding functions. Bit RDPPM indicates that the periodic metering pulses received during a particular telephone call utilizing interface circuit 105 are to be transmitted to the central control circuit 120. Bit MLS indicates that the semiautonomous control circuit 200 is to monitor the line sense circuit 403 during this particular state. Bit INM indicates to the processor 300 that the monitoring of the line sense circuit should be inhibited after receiving one report. Bit CFPPM defines special information which is required when the trunk circuit is being utilized within a conference call. Bit RPFG is the PPM readout flag and specifies that charging pulses should be repeated toward the subscriber station originating on this particular telecommunication system.

TABLE 4

| BIT NO. | NAME | FUNCTION |
|---|---|---|
| | | PPMINF DATA |
| 0 | RDPPM | Read out PPM to central control |
| 1 | MLS | Monitor line sensor |
| 2 | INM | Inhibit monitoring after 1 report |
| 3 | CFPPM | Conference - PPM report |
| 4 | RPFG | PPM readout flag |
| 5-7 | | Spare |

FIG. 7 of the drawing depicts the relative structure of memory locations of read/write portion of memory 320. The read/write memory is entitled RWMEM. RWMEM comprises memory words which require modification of data words therein during operation of trunk interface circuit 105. The data words comprise status information bits and timing counters utilized to determine the time lengths of pulses received and transmitted. Word location IPULSE shown in FIG. 7 defines the specific status of pulses being transmitted and received during circuit operation. Table 5 shown below lists the particular function of each bit within location IPULSE. Bits 0 through 3 of location IPULSE define information regarding the types of pulses received from the distant office during circuit operation. Bit 4, i.e., bit PMRT, indicates that a charging pulse has been received from the distant office and should be utilized to peg the meter count of the calling subscriber station. Bit DBLK indicates that a blocking signal has been received from the distant office. Bits PIP and GIP are utilized during circuit operation to indicate that a particular pulse or a gap between pulses is presently being transmitted.

TABLE 5

| BIT NO. | NAME | FUNCTION |
|---|---|---|
| | | IPULSE DATA |
| 0 | PREC | Pulse received from distant office |
| 1 | FREC | Received "release" when "answer" expected |
| 2 | PSHT | Short pulse received |
| 3 | PLNG | Long pulse received |
| 4 | PMET | Meter pulse received |
| 5 | DBLK | Blocking signal received |
| 6 | PIP | Pulse in progress |
| 7 | GIP | Gap in progress |

Another word location within memory RWMEM defines the types of pulses to be sent to the distant office, and is named SNDP as shown in FIG. 7. Table 6, shown below, indicates the functions to be executed when a particular bit of location SNDP is in the high state. The data bits within SNDP may correspond to data bits within the state control blocks and are utilized within the instruction sequences to define a function which is to be executed at a later time.

TABLE 6

| BIT NO. | NAME | FUNCTION |
|---|---|---|
| | | SNDP DATA |
| 0 | RSHT | Request a short pulse |
| 1 | RLNG | Request a long pulse |
| 2 | RBLK | Request a blocking signal |
| 3 | SPIP | Transmitted pulse is in progress |

The block of word locations within memory RWMEM and defined as TMRS in FIG. 7 are timing counters. The timing counters are utilized when transmitting or receiving pulses to determine the actual duration of a pulse received or to specify the particular duration of time for which a pulse is to be transmitted. Location PCNT, also shown in FIG. 7, is the counter for the PPM charging pulses and is pegged each time a PPM pulse is received. Location CRLY defines the current switch control signal and scanner signal status during circuit operation. Location CSCS defines the value of the current state signals SD0 through SD2. Location PPMTR defines transient information relating to the status of pulses being sent to the central control circuit 120 as PPM data. It should be noted that numerous types of memory and instruction sequence structures may be utilized to perform the functions associated with the trunk interface circuit 105 in accordance with the invention.

FIG. 8 depicts the values of data bits within the state control blocks stored in the ROM for each of the 17 states of the illustrative embodiment of trunk interface circuit 105 described in accordance with the invention. The state associated with a particular state control block is shown in parentheses and corresponds to the states and associated state control blocks shown in Table 1. Each of the 17 states depicted in FIG. 8 and in Table 1 will be described in subsequent paragraphs herein.

Figure 9:
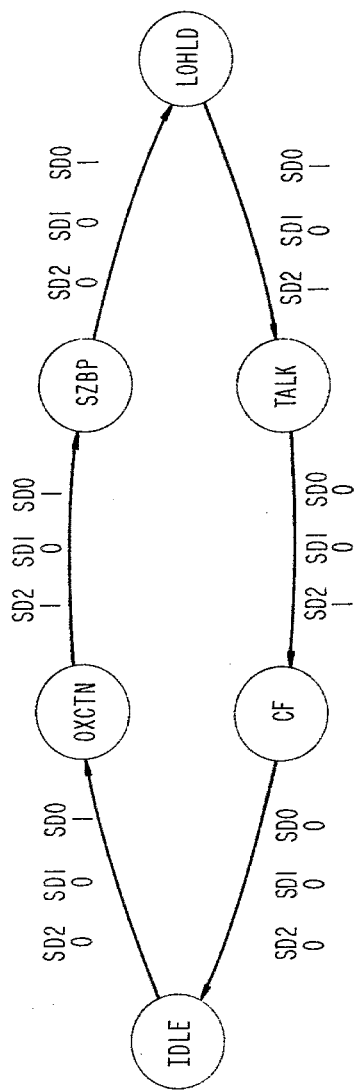
FIG. 9 is a state diagram of the sequence of states of the illustrative trunk interface circuit during the various stages of a simple interoffice telephone call.

FIG. 9 represents a functional diagram of the states of trunk interface circuit 105 during the various stages of a simple interoffice call. The corresponding values of state signals SD0 through SD2, when changing from one state to another, are also shown in FIG. 9. The specific trunk circuitry functions to be described with respect to FIG. 9 are well known in the art. As previously described, when each of state signals SD0 through SD2 is in the low state, interface circuit 105 is in the IDLE state. When a calling subscriber station 109 requests service and an interoffice call is to be established to a distant office utilizing interface circuit 105 and an associated transmission facility 103, state signal SD0 is changed to a high state and interface circuit 105 is changed to the OXCTN state. While in the OXCTN state, a seizure signal (which is a continuous off-hook signal in most telecommunication systems) is transmitted to the distant office via conductor MSIG of transmission facility 103. A transceiver circuit (one of service circuits 104 well known in the art) is connected to the distant office via switching network 102. A continuity test is then made to insure adequate communication connections. If the continuity test shows proper connections, interface circuit 105 is changed to the "seize bypass" state SZBP by changing state signal SD2 to the high state. While interface circuit 105 is in the SZBP state, digits are outpulsed to the distant office via the aforementioned transceiver service circuit.

When outpulsing is completed and appropriate signals have been received from the distant office via conductor ESIG of transmission facility 103, interface circuit 105 is changed to the "local hold" state LOHLD via a change of state signal SD2 to the low state. In the LOHLD state, communication paths are established from calling subscriber station 109 to interface circuit 105 via switching network 102. Also during the LOHLD state, ringing tone is supplied to the called subscriber station associated with the distant office. When the called subscriber station answers, the distant office transmits appropriate signals to interface circuit 105 and the interface circuit is changed to the TALK state via a change of state signal SD2 to the high state. A voice communication path is then established between the calling and called subscriber stations, and the ESIG conductor is monitored for PPM charging pulses or a disconnect signal. If a disconnect signal by either subscriber station is detected, appropriate signals are transmitted to central control circuit 120 and interface circuit 105 is then changed to the "clear-forward" state CF via a change of state signal SD0 to the low state. While in the CF state, communication paths are "cleared" and appropriate signals are transmitted to the distant office and the central control circuit 120. Upon completion of all tasks, interface circuit 105 is returned to the IDLE state via a change of state signal SD2 to the low state.

As previously mentioned, FIG. 9 merely depicts states of trunk interface circuit 105 for a simple interoffice call. Others of the 17 states shown in Table 1 and FIG. 8 are utilized when more complex functions are associated with a particular telephone call, e.g., repeating PPM charging pulses to the calling subscriber station.

The following paragraphs specifically describe the arrangement of the various communication and signaling paths of trunk interface circuit 105 shown in FIGS. 3 and 4 for each of the 17 states shown in Table 1 and FIG. 8. As previously described, whenever all of the state signals are in the low state, the trunk interface circuit 105 is in the IDLE state. When in the IDLE state, both of the scanner signals SC0 and SC1 are in the on-hook state, i.e., the low state. The communication lines TS and RS form an open path toward the switching network 102. The sense circuit 403 is monitored by the semiautonomous control circuit 200 for a blocking signal which, if received on conductor ESIG, is reported to central control circuit 120 via scanner signal SC1 as an off-hook signal. The isolation amplifier circuits 408 and 409 are not powered and therefore previously described idle circuit termination is connected toward the voice communication conductors of transmission facility 103. State OXCTN is a state in which the trunk interface circuit 105 will be established when one of service circuits 104 is to be connected and a continuity test is to be performed. During this state the line sense circuit 403 is connected across the communication lines TS and RS within hybrid circuit 203 toward switching network 102. The state of the line sense circuit 403 will be reported to the central control circuit 120 via scanner signal SC0. Idle circuit termination is connected toward the transmission facility 103. The receiving path ESIG of transmission facility 103 is monitored via sense circuit 405 for a blocking signal, which if seen, is reported as an off-hook signal via scanner signal SC1.

State SZBP is the "seize-bypass" state and is utilized when outpulsing is executed toward the distant office. During this state the high impedance battery circuit 402 and line sense circuit 403 are removed from communication lines TS and RS. A seizure signal is sent toward the remote telecommunication system 140 via transmitting path MSIG. The amplifier circuitry of trunk interface circuit 105 is activated, thereby connecting the transmission circuit 103 to the interface circuit 105 in a voice communication configuration. The receiving path ESIG is monitored via sense circuit 405 for either a forced release signal, well known in the art, or a blocking signal from the distant office. If either is detected, it is reported as an off-hook signal to the central control circuit 120 via scanner signal SC1. State LOHLD, when activated, opens paths of the communication lines TS and RS. The receiving path ESIG is monitored for either a forced release signal or for PPM pulses. If a forced release signal is detected, it is reported as a 1-second off-hook signal followed by an on-hook signal via scanner signal SC1. As previously described, the durations of signals are dependent on the particular signaling system utilized. During this time the PPM count is accumulated via the semiautonomous control circuit 200. State LNPPM is the same as the LOHLD state except that the charging pulses are repeated to the calling subscriber station 109 via PPM repeater generation circuit 304. If this state is not entered, the PPM pulses will be "counted" but will not be repeated toward the line. The TALK state, when entered, connects the line sense circuit 403 and the battery circuit 402 across communication lines TS and RS. The status of the line sense circuit 403 is reported via scanner signal SC0 to the central control circuit 120. The ESIG receiving path is monitored, via sense circuit 405, for PPM pulses and a forced release signal. The PPM count is accumulated in words of memory 320 as previously described. If indicated by data words in memory 320, the PPM pulses will be repeated toward the calling subscriber station. The first PPM pulse received is reported as an off-hook signal via scanner signal SC1. If a forced release signal is detected on receiving path ESIG, it is reported as an on-hook signal via scanner signal SC1 if the first PPM pulse has been received. If the first PPM pulse has not been received, the forced release signal is reported as a 1-second off-hook followed by an on-hook signal via scanner signal SC1. The states CCHLD and CCCTN are identical to the LOHLD state and are utilized when a conference call is established via trunk interface circuit 105. The differing functions associated with conference calls utilizing a trunk interface circuit are well known in the prior art. The CCWT state is utilized as a waiting state to connect two states which vary by more than one particular state signal modification. The functions within the state control block associated with the CCWT state are the same as those for state LOHLD. In the CCONF state, the communication lines TS and RS are disconnected from the battery circuit 402 and line sense circuit 403. The isolation amplifiers 408 and 409 are activated, connecting the voice communication conductors of transmission facility 103 to the interface circuit 105. The receiving path ESIG is monitored for PPM pulses and a forced release signal. The PPM count is incremented but no PPM charging pulses are sent toward the calling subscriber station. If the PPM pulse is the first PPM pulse received, scanner signal SC1 is changed to an off-hook state. If a forced release signal is received, it is reported as an on-hook signal via scanner signal SC1 if PPM pulses have been received. If no PPM pulses have been received it is reported as a 1-second off-hook signal followed by an on-hook signal. State COHLD is the same as state LOHLD except that a forced release signal is reported as a continuous off-hook signal and the PPM pulses are not repeated toward the calling subscriber station although the PPM count is incremented. The COCTN state is the conference continuity check state. The battery circuit 402 and line sensor circuit 403 are connected across the communication lines TS and RS. The status of the line sense circuit 403 is reported via scanner signal SC0. The receiving path ESIG is monitored for PPM pulses or a forced release signal. The PPM count is incremented but no PPM pulses are repeated. If a forced release signal is received, it is reported as an on-hook signal via scanner signal SC1. The CWAIT state serves as a waiting state to connect two states that vary by more than one state signal modification. The state control block associated with this state is the same as that for state COCTN. The CONF state is utilized with conference calls in which the communication lines TS and RS are connected from switching network 102 through the hybrid circuit 203 to transmission facility 103. The battery circuit 402 and line sense circuit 403 are removed from across the communication line. The isolation amplifiers 408 and 409 are activated, thereby connecting the transmission facility 103 to the interface circuit 105 in a voice communication arrangement. The receiving path ESIG is monitored for PPM pulses and a forced release signal. The PPM count is incremented but no PPM pulses are repeated. Received PPM pulses are repeated to the central control circuit 120 via scanner signal SC0. If a forced release signal is received, it is reported as an on-hook signal via scanner signal SC1. The CF state is the "clear-forward" state. In this state the communication lines TS and RS are disconnected from a communication path to switching network 102. The isolation amplifiers 408 and 409 are deactivated and a "clear-forward" signal is sent to the distant office via the transmitting path MSIG. The accumulated PPM pulse count is sent to the central control circuit 120 via scanner signals SC0 and SC1. The receiving path ESIG is monitored for a "release" signal from the distant office. After the PPM count has been transmitted, a report as an off-hook signal via scanner signal SC1 is sent to the central control circuit 120 until a release signal is received from the distant office. At that time the scanner signal SC1 is changed to an on-hook signal. State CFR0 is utilized as a transient state. No changes are made in the signals to the relay circuitry of switching circuit 201 within this state. The receiving path ESIG is monitored for a release signal. If the release signal is received, scanner signal SC1 is changed to an on-hook signal. The "readout" state RO serves to transmit the PPM count to the central control circuit 120. No changes are made in the signals to the relay circuitry within the switching circuit 201. The PPM count is transmitted to the central control circuit 120 via scanner signals SC0 and SC1. After the PPM count is transmitted, scanner signal SC1 will be in an off-hook state until a release signal is received on the ESIG receiving path, at which time it will be repeated to the central control circuit 120 as an on-hook signal on scanner SC1.

It should be noted that in accordance with the invention, any set of control functions may be defined within any given set of states. The invention is not limited to the particular states and the particular functions defined herein. As defined in the previous paragraphs, several states associated with the illustrative embodiment of interface circuit 105 described herein relate to the use of conferencing within an interoffice call. The specific functions required for conferencing arrangements utilizing a trunk interface circuit are well known to those skilled in the telephony arts.

Figure 10:
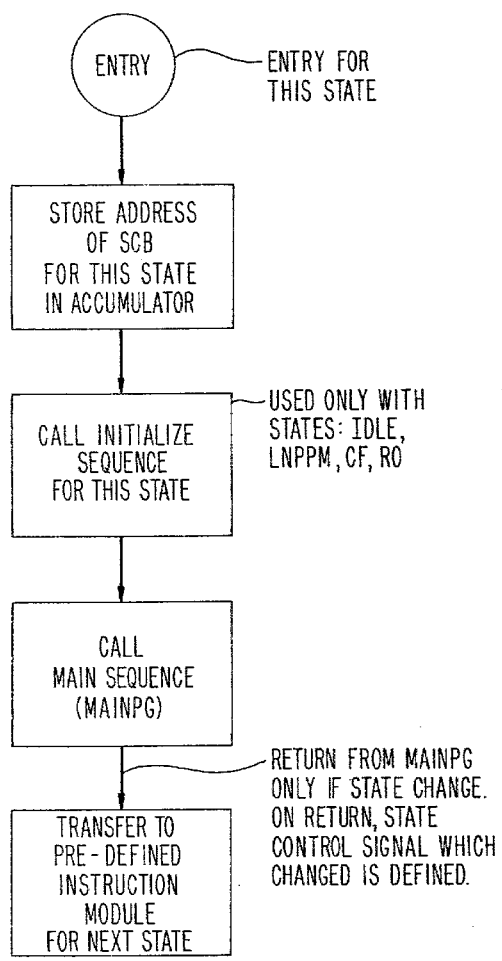

FIGS. 10 through 25 of the drawing depict function sequences of actions to be performed by the processor 300 in controlling trunk interface circuit 105. As previously described, each state of the trunk interface circuit 105 has an associated state control block within the read-only portion of memory 320. Each state also has associated with it a separate set of program instructions to be executed by the processor 300. FIG. 10 of the drawing depicts a sequence of functions which will be performed by execution of the set of instructions which exist for each state of trunk interface circuit 105. The method of transferring processor control to the individual instruction modules for each state will be described in subsequent paragraphs herein. However, for the IDLE state, the processor 300 is designed to immediately execute the general instruction module associated with the IDLE state upon initialization by either of reset circuits 408 and 409 previously described with respect to FIG. 4. In the illustrative embodiment described herein, a general control register which is utilized extensively throughout the sequences of instructions for control of trunk interface circuit 105 is the "accumulator" register and may be any general purpose register within the processor 300. As shown in the sequence diagrams of the drawing, the accumulator register is represented as ACCUM. As shown specifically in FIG. 10, upon transfer of processor control to the general instruction module for a particular state, the memory address of the associated state control block (designated as SCB) for the particular state is stored in the accumulator register. For certain states, namely IDLE, LNPPM, CF and RO, an initialization instruction sequence is also utilized within the general instruction module for the particular state. The initialization sequence executes specific functions which are required for these given states and an exemplary sequence for the IDLE state will be described herein. After the initialization sequence is executed, processor control is transferred to the main sequence of instructions, named MAINPG. In the sequence diagrams of the drawing, "CALL" indicates a transfer of processor control with capability to return at a later time to execution of instructions immediately following the transfer location. The main sequence MAINPG will be defined within subsequent figures of the drawing and described in subsequent paragraphs herein. As shown in FIG. 10, a "return", i.e., a return of processor control, is made to the general instruction module from the main sequence only if a change of the state signals SD0 through SD2 has been detected by the processor 300. When a change has been detected, the particular state signal which has changed is defined to the general instruction module. Upon return from the main sequence, processor control transfers to the general instruction module associated with the next state as defined by the changed state signal. In this manner, the previously described Gray code process of changing states via a modification of one of state signals SD0 through SD2 is effected within the instruction sequence structures.

Figure 11:
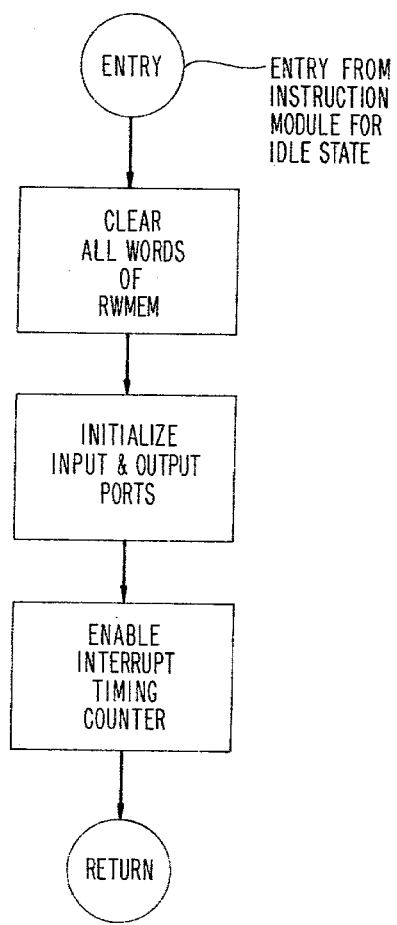

As previously stated, an initialization sequence may be called from the general instruction module associated with a particular state. For example, FIG. 11 depicts a sequence diagram for the initialization sequence utilized with the IDLE state. As shown in FIG. 11, entry is made to the initialization sequence from the general instruction module for the IDLE state as previously described. The initialization sequence for the IDLE state first clears, i.e., sets each data bit to a binary "0", all of the memory words of the read/write memory RWMEM. Initialization signals are then sent to the previously described input and output ports of processor 300. An interrupt timing counter is then enabled and is utilized to effect transfer of processor control to an interrupt instruction sequence periodically during operation of interface circuit 105. A return of processor control is then made to the general instruction module for the IDLE state. For purposes of description, the notation "RTN" within sequence diagrams of the drawing designates a return of processor control to the calling instruction sequence.

Figure 12:
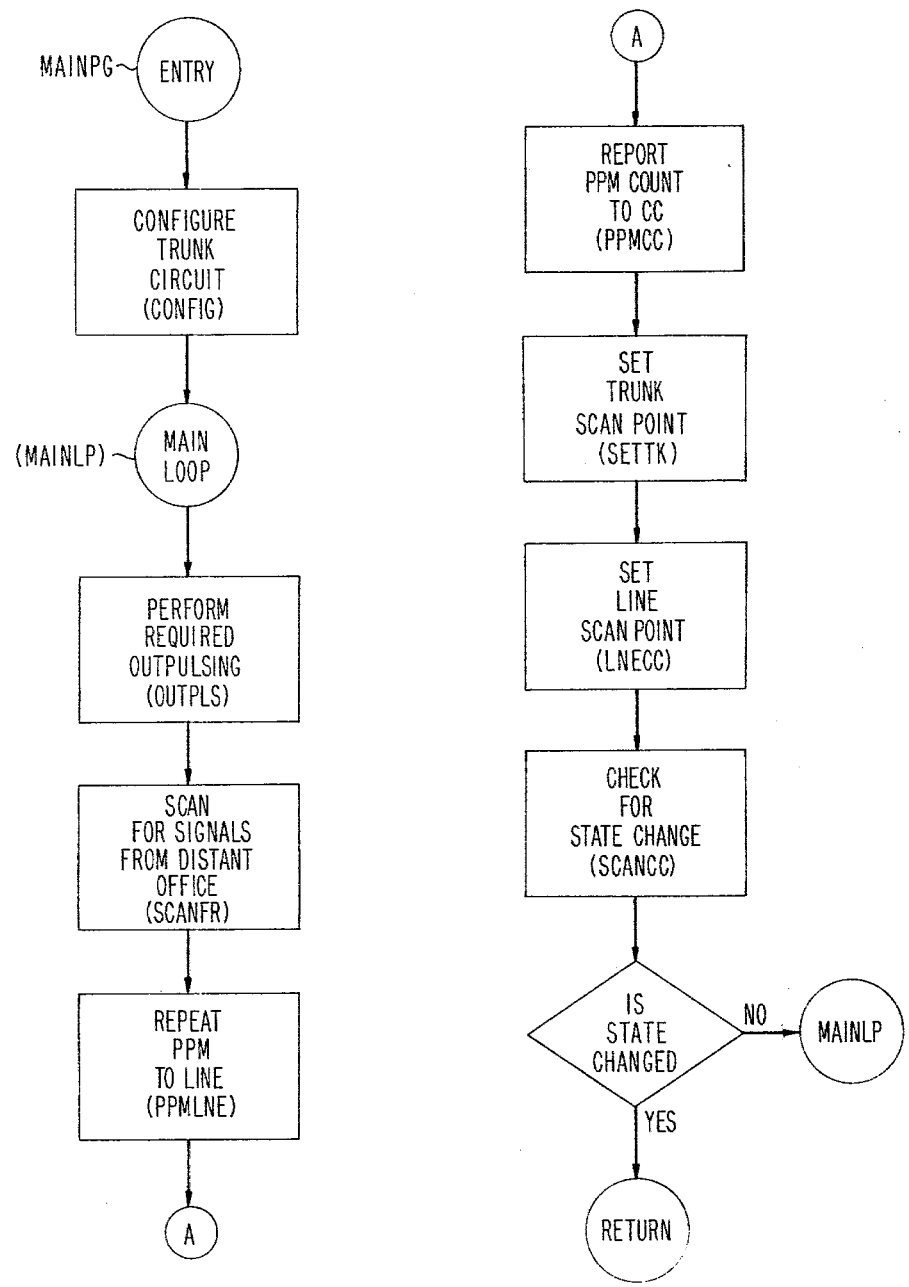

As previously described with respect to the sequence diagram of FIG. 10, each state of the trunk interface circuit 105 has an associated state control block and a separate instruction module associated therewith. Within each instruction module a main sequence (MAINPG) is called via a subroutine procedure which is well known in the art. FIG. 12 depicts the general functions executed within main sequence MAINPG. As shown in FIG. 12, the main sequence comprises a number of "calls" to instruction sequences which selectively execute various functions associated with the trunk interface circuit 105. The entry to the main sequence is made via a call from the previously described general instruction modules for each state. On entry to the main sequence, a instruction sequence CONFIG is called which performs functions related to configuration of various communication and signaling paths within the switching circuit 201 of trunk interface circuit 105. Following the configuration function, a call is made to instruction sequence OUTPLS to perform any required transmission of signals to the distant office. Upon return from instruction sequence OUTPLS, sequence SCANFR is called which monitors the sense circuit 405 connected to receiving path ESIG for any signals received from the distant office. Sequence PPMLNE executes functions associated with repeating PPM charging pulses toward the calling subscriber station.

As described in previous paragraphs, these functions are required when a customer premise meter or coin apparatus is associated with the calling subscriber station. Following return from sequence PPMLNE, processor control is transferred to instruction sequence PPMCC which performs functions associated with reporting the PPM count to the central control circuit 120 as required. Upon return from sequence PPMCC, instruction sequence SETTK is called which executes functions associated with setting the scanner signal SC1 to particular values dependent upon data within the state control block associated with the present state. Similarly, sequence LNECC is called to perform functions associated with setting scanner signal SC0 to required values. After the previously described instruction sequences are completed, a sequence SCANCC is called to test for any change of state signals SD0 through SD2 which may have occurred since the previous "look" at each of the state signals. As shown in FIG. 12, if a state change has occurred a return is made from the MAINPG sequence to the calling general instruction module as previously described with respect to FIG. 10. If no change has occurred in the state signals, processor control is transferred to location MAINLP which follows the call to instruction sequence CONFIG as shown in FIG. 12. The main sequence MAINPG is thus a common "loop" of instruction sequence calls to execute specific functions and is utilized regardless of the particular state of interface circuit 105. Processor control is returned to the calling general instruction module only upon detection of a state signal change. However, as shown in FIG. 12, the sequence CONFIG is executed only once per change of state signals SD0 through SD2. As is depicted in subsequent figures of the drawing, the instruction sequences called from within MAINPG will execute their respective functions as defined by the data bits of the state control block corresponding to the present state of the trunk interface circuit 105. It should be noted that the amount of time required to execute these functions of the instruction loop MAINPG must provide for pulses being received on receiving path ESIG and pulses being transmitted on transmitting path MSIG to be detected for required durations of time.

Figure 13:
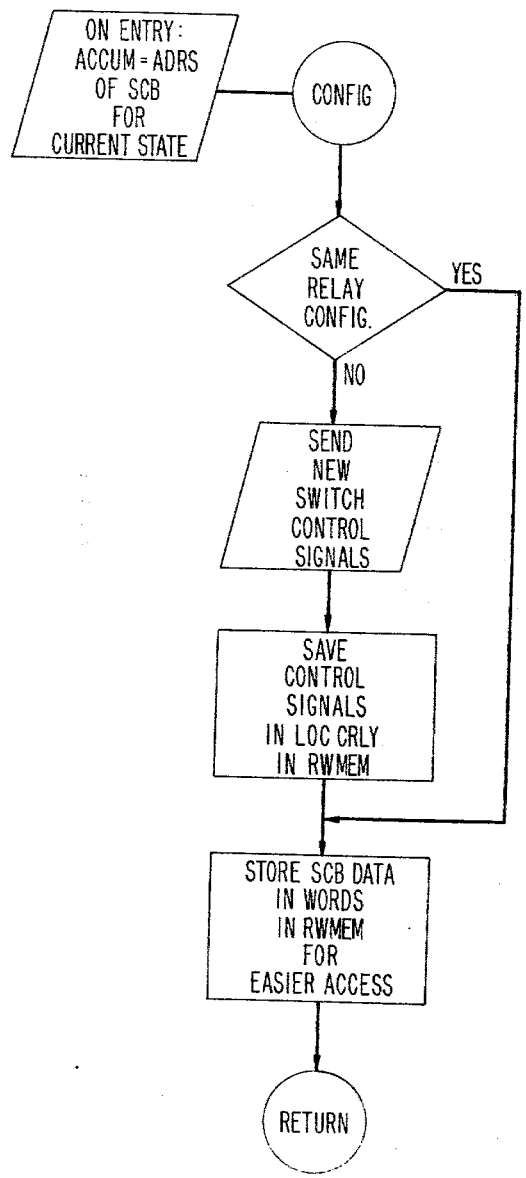

FIG. 13 depicts the general structure of the instruction sequence CONFIG. As described with respect to FIG. 12, CONFIG performs required generation of switch control signals to operate the relay circuitry of switching circuit 201 if a new relay configuration is associated with the present state. This sequence is executed only once per change of the state signals SD0 through SD2. As shown in FIG. 13, on entry to sequence CONFIG the accumulator register contains the memory address of the state control block corresponding to the current state of interface circuit 105. Utilizing previously stored data representing the former status of the relay circuitry, i.e., the data within location RLYWD of the state control block corresponding to the previous state, a test is made to determine if the new state has the same requisite relay configuration as the prior state. If the requisite relay configuration is not the same, a new set of switch control signals is transmitted to an output port of processor 300. The new set of signals is then stored in location CRLY of the read/write memory RWMEM and will be utilized when a new state change occurs. If the relay configuration is the same as the prior state, new relay orders need not be transmitted to the output port and, as shown in FIG. 13, the only function to be executed is to store the state control block data associated with the new present state in locations of read/write memory RWMEM for easier access by subsequent instruction sequences. A return is then made to the main sequence MAINPG.

Figure 14:
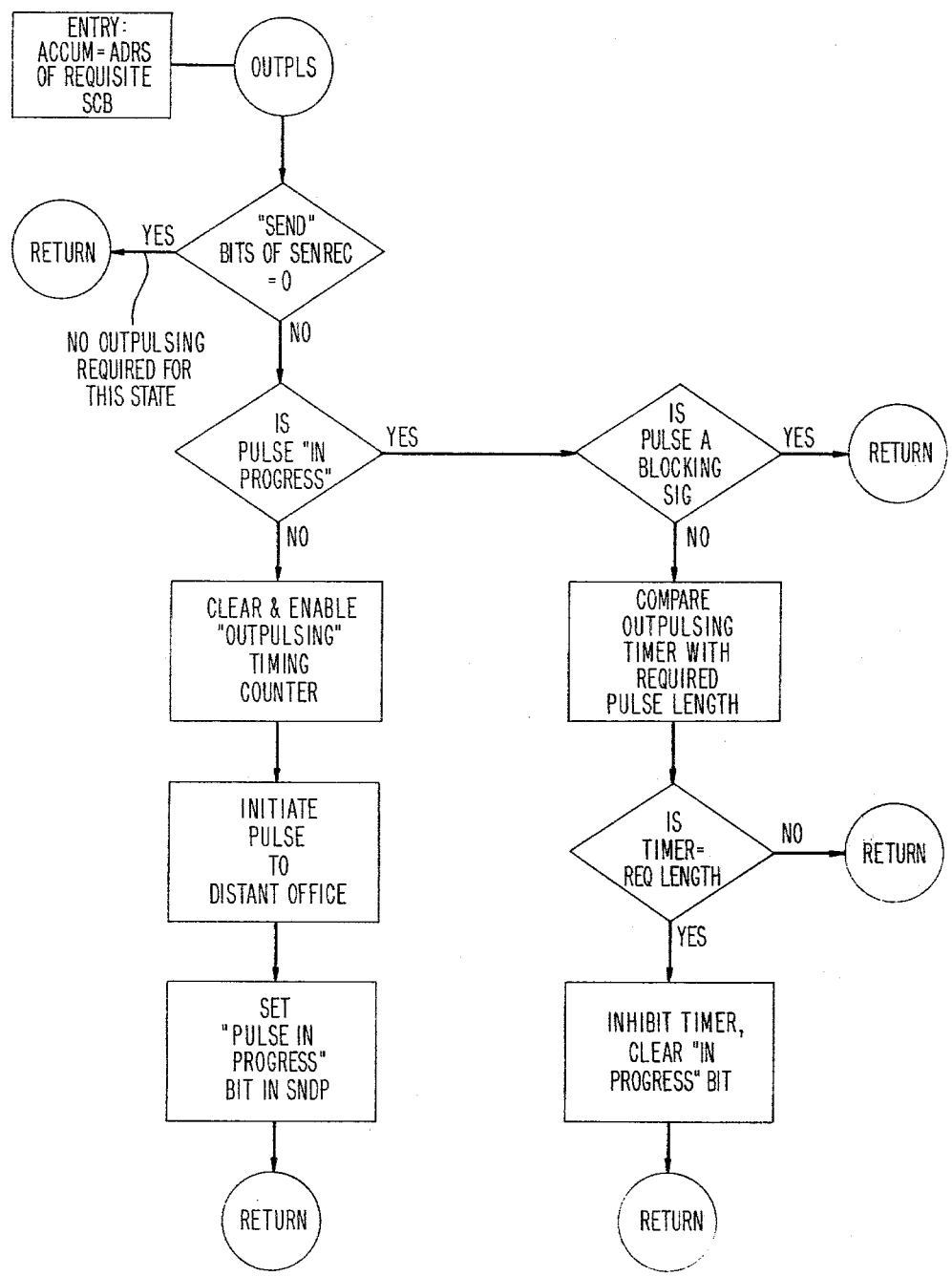

FIG. 14 depicts the general structure of instruction sequence OUTPLS. As previously described, sequence OUTPLS is utilized to transmit any required pulses to the distant office. As with each instruction sequence herein described, upon transfer of processor control, i.e., entry to the sequence, the accumulator register contains the address of the requisite state control block for the present state of trunk interface circuit 105. The first test made within sequence OUTPLS is to determine if any of the "sending" bits of word SENREC (bits 0–2 as previously described and shown in Table 2) for this particular state control block are in the high state. For purposes of description, a bit in the high state will be designated as "set" while a bit in the low state will be designated as "reset" or "cleared". If none of the bits are set, then no outpulsing is presently required for this particular state and a return is made to the main sequence MAINPG. If any of the bits are set, then a test is made to see if a pulse is presently "in progress", i.e., is presently being transmitted to the distant office. This test is performed by testing the requisite bits in location SNDP previously described with respect to Table 4. As shown in FIG. 14, if no pulse is presently in progress then an outpulsing timing counter is initialized and a pulse is initiated to the distant office via the operation of relay RLYD in switching circuit 201 as previously described with respect to FIG. 4. After the pulse is initiated the "pulse-in-progress" bit is set in location SNDP and a return is made to MAINPG. If a pulse "in progress" was initially detected, then a test is made of bits within the corresponding state control block to determine the length of pulse required to be transmitted. If the required pulse is a blocking signal then no other action need be taken and a return may be made to MAINPG. If the pulse required to be sent is not a blocking signal, then the outpulsing timing counter which was previously initialized is compared with data bits defining the required pulse length of the pulse presently being sent. If the timing counter is presently equal to the required length, then the pulse is defined as being "ended" and the outpulsing timing counter is inhibited and cleared. Further, the bit defining the pulse as being "in progress" is also cleared. A return is then made to MAINPG. If the counter was not equal to the required length at this time, then a return is also made to MAINPG.

Figure 15:
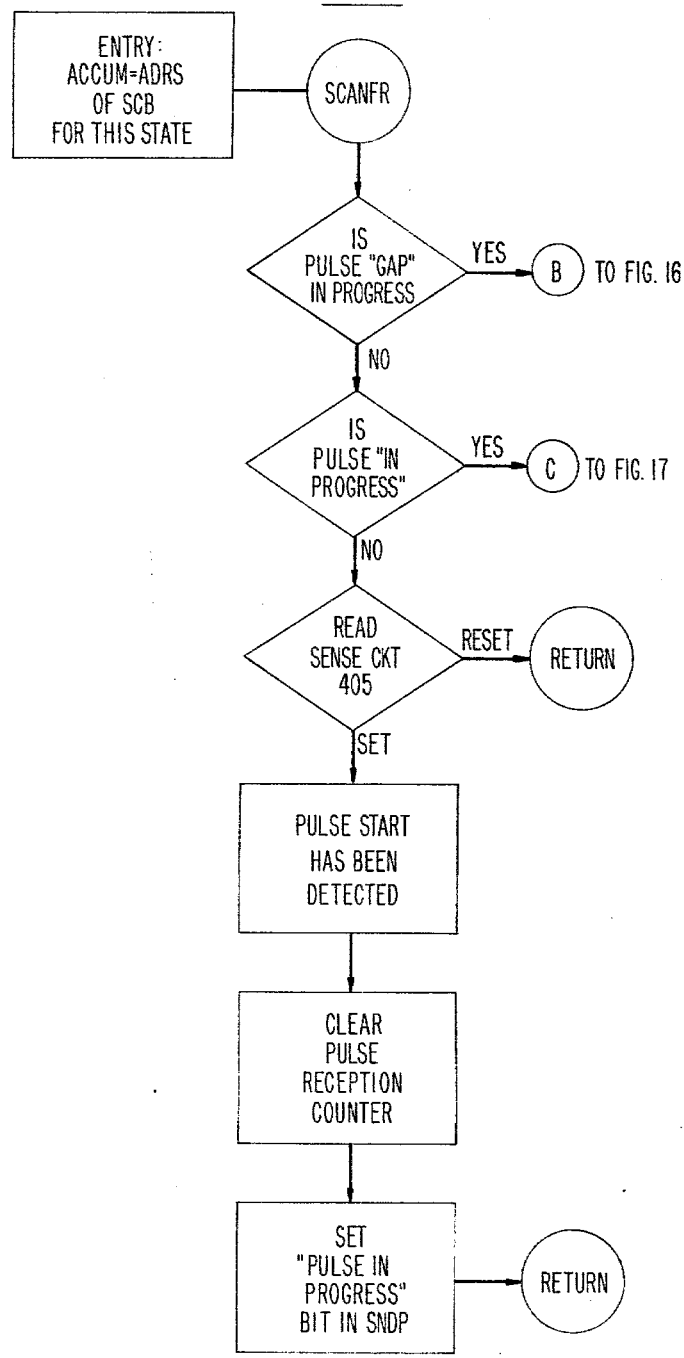
Figure 16:
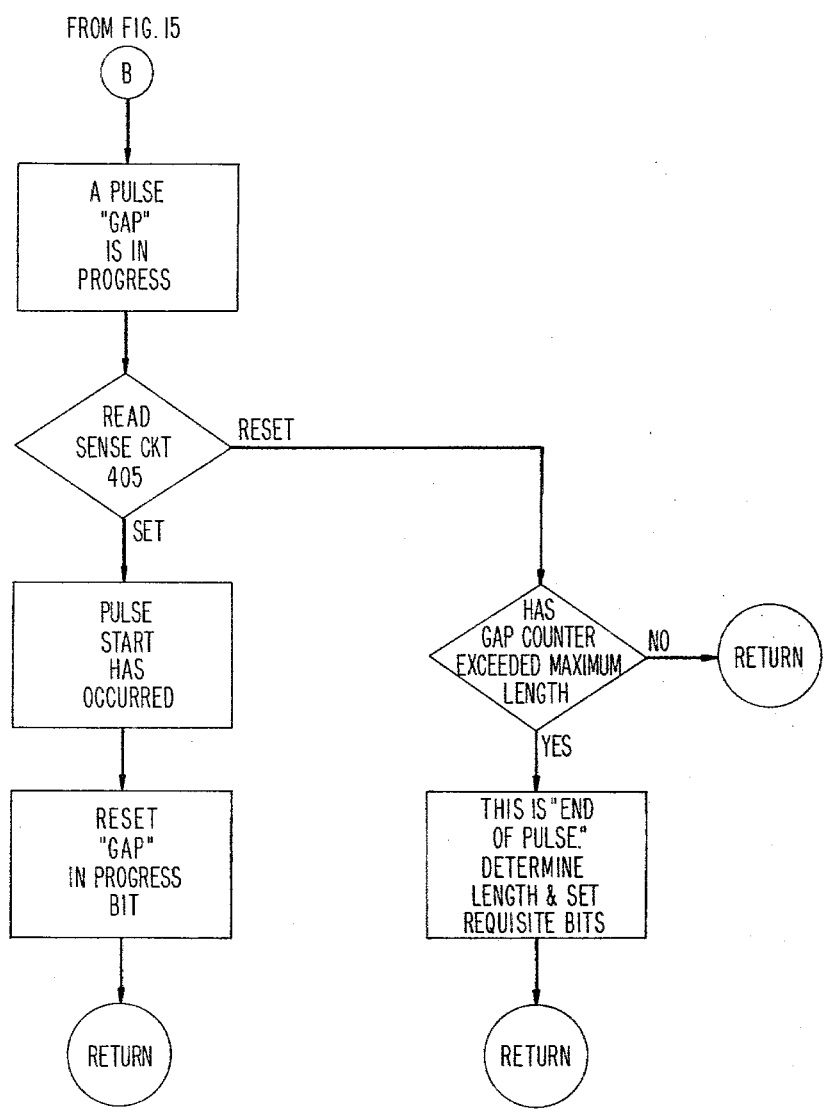
Figure 17:
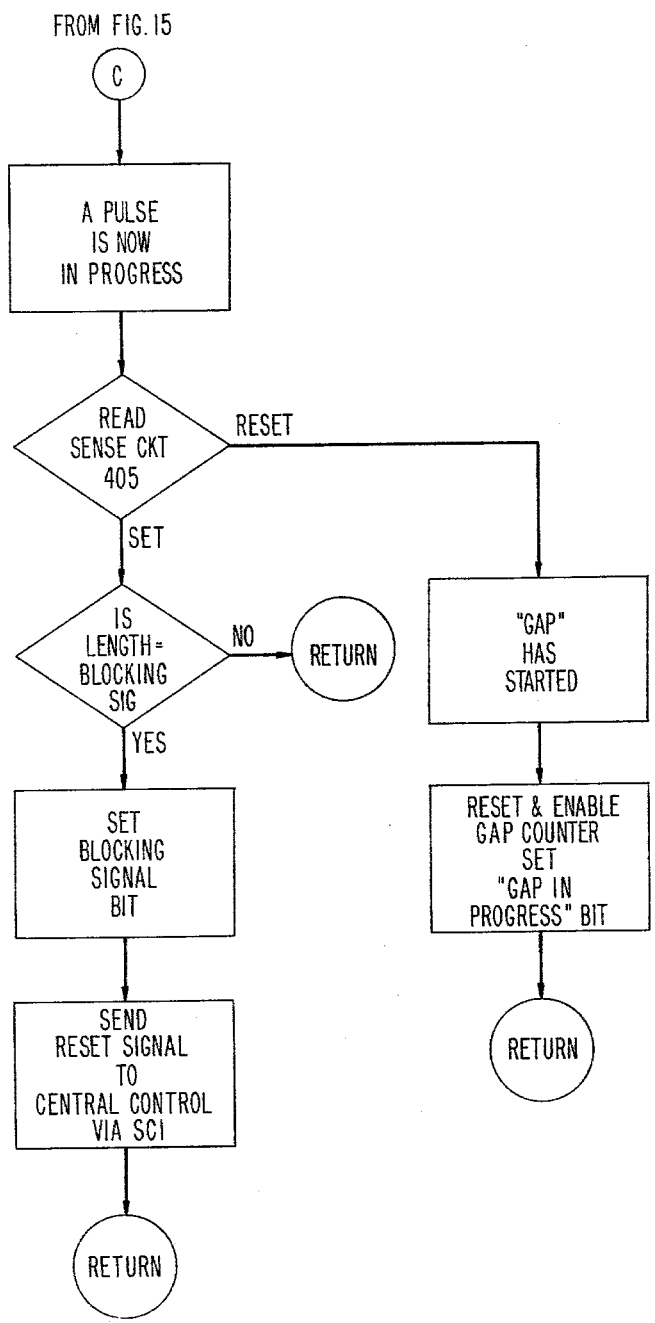

FIGS. 15–18 comprise a diagram of the instruction sequence SCANFR, which executes functions associated with scanning for signals on receiving path ESIG transmitted from the distant office and detected by sense circuit 405 as shown in FIG. 4. On entry to sequence SCANFR the accumulator register again contains the memory address of the state control block for this particular state. The first test which is made within this particular routine determines if a received pulse "gap" is presently "in progress" as defined by requisite data bits within read/write memory RWMEM. If no "gap" is in progress then a test is made of the requisite bits to determine if a received pulse is presently "in progress". If neither the gap nor the pulse is in progress at this time, a signal is sent to the input port connected to sense circuit 405 to "read" the state of the sense circuit. If the sense circuit is in a a set state, i.e., the signal on conductor ESIG is in a high state, then a pulse "start" is defined as having been detected. As shown in FIG. 15, a pulse reception timing counter is then cleared and a pulse-in-progress data bit is set in word location SNDP of read/write memory RWMEM. If sense circuit 405 is found to be clear i.e., in a low state, then a return is made to MAINPG indicating that there is presently no pulse existing from the distant office. As shown in FIG. 16, if a "gap" has been found to be in progress in the initial test made in instruction sequence SCANFR, then again a "read" signal is sent to the corresponding input port to read the status of sense circuit 405. If it is found to be in a set state, then the gap is considered to be completed and a pulse start has been initiated. The bits defining a "gap" as being in progress are then reset, i.e., put in a low state, and a return is made to MAINPG. If the sense circuit 405 is determined to be in a low state, a test is made to determine if a gap timing counter has exceed the maximum expected length of time. If the timing counter has not exceeded the maximum length of time, a return is made to MAINPG. If the timing counter has exceeded the maximum length, the gap is defined as being the "end" of a pulse. In this instance, a determination is made of the length of the pulse which has been received and requisite data bits are set within read/write memory RWMEM indicating both the received pulse type and the fact that a pulse has ended. If a pulse had been found to be in progress in the previously described test, sense circuit 405 is again read as depicted in FIG. 17. If the circuit is in the set state, a test is made to determine if the present length of the pulse is equal to the length of a blocking signal. If it is not equal to this length, a return is made to MAINPG. If it is equal to the requisite blocking signal length a bit indicating that a blocking signal has been received is set and a reset signal is sent to the central control circuit 120 via scanner signal SC1. If, upon reading the sense circuit 405, it is found to be in the reset state, a gap is determined to have been started and the gap timing counter is cleared and enabled. Accordingly, a gap-in-progress bit within memory RWMEM is set and a return is made to the main sequence MAINPG. By these instruction sequences comprising SCANFR, the processor 300 detects signals received from the distant office on receiving path ESIG and further detects the length of the pulses received while setting requisite bits defining to other instruction sequences the specific signals that have been received.

Figure 18:
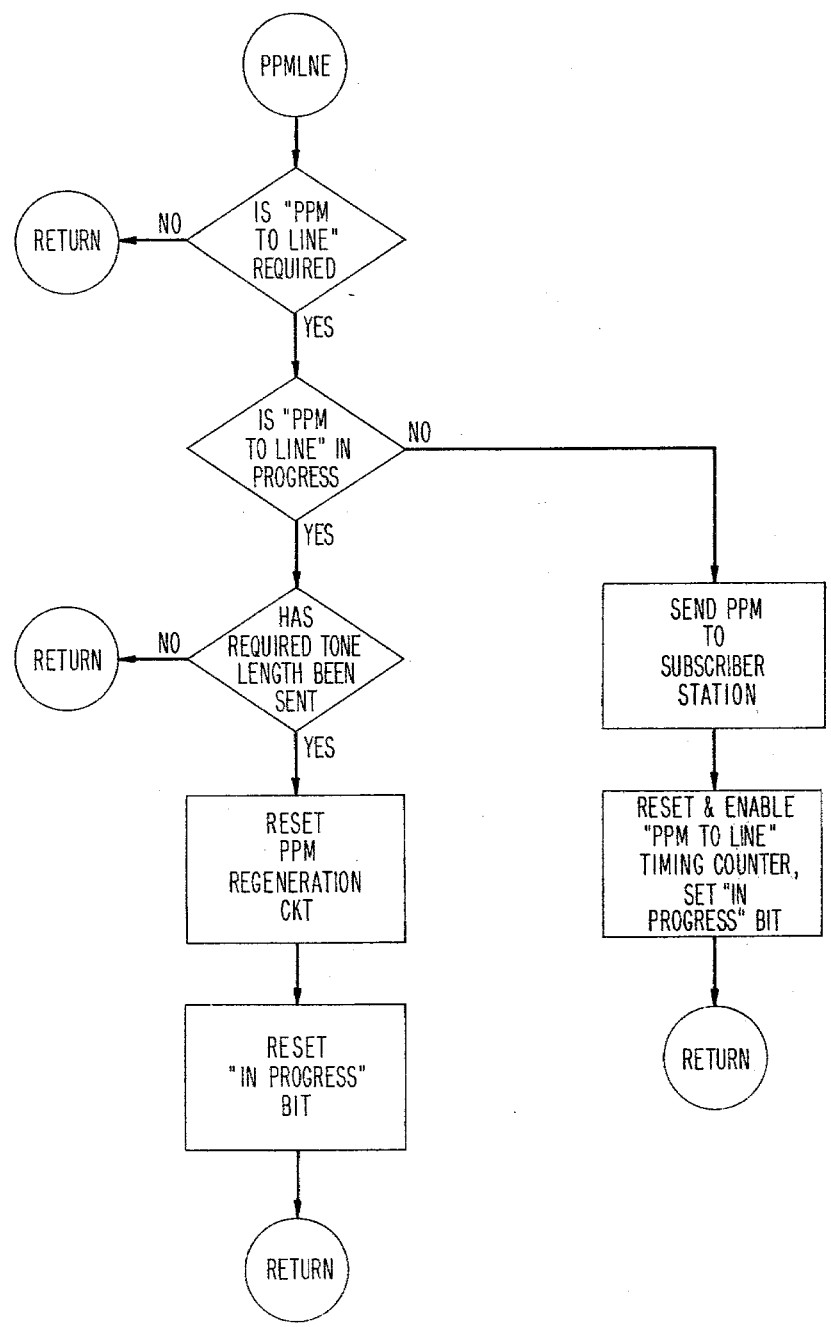

FIG. 18 depicts a diagram for instruction sequence PPMLNE which as previously described, is utilized to repeat PPM pulses to a subscriber station when required. On transfer of control to sequence PPMLNE, a test is made to determine if the "PPM to line" bit previously described is set within the corresponding state control block, thereby indicating that such a function should be executed. If the bit is not set, then a return is immediately made to the MAINPG. If the requisite bit is set, a test is made to determine if a "PPM-to-line" tone is presently in progress. If it is in progress, a further test is made to determine whether the required tone length has been transmitted to the subscriber station. If the required length has not been transmitted, then a return is made to MAINPG. If the requisite tone length has been transmitted, a reset signal is transmitted to the previously described PPM regeneration circuit 304 via an output port of processor 300. Further, an "in progress" bit corresponding to the PPM tone generation function is also reset and a return is made to MAINPG. As shown in FIG. 18, if the PPM tone is not presently "in progress", a signal is transmitted, via an output port, to regeneration circuit 304 to send a PPM tone signal to the subscriber station. A timing counter associated with PPM tone regeneration is reset and enabled and an "in progress" bit is set. A return is then made to MAINPG.

Figure 19:
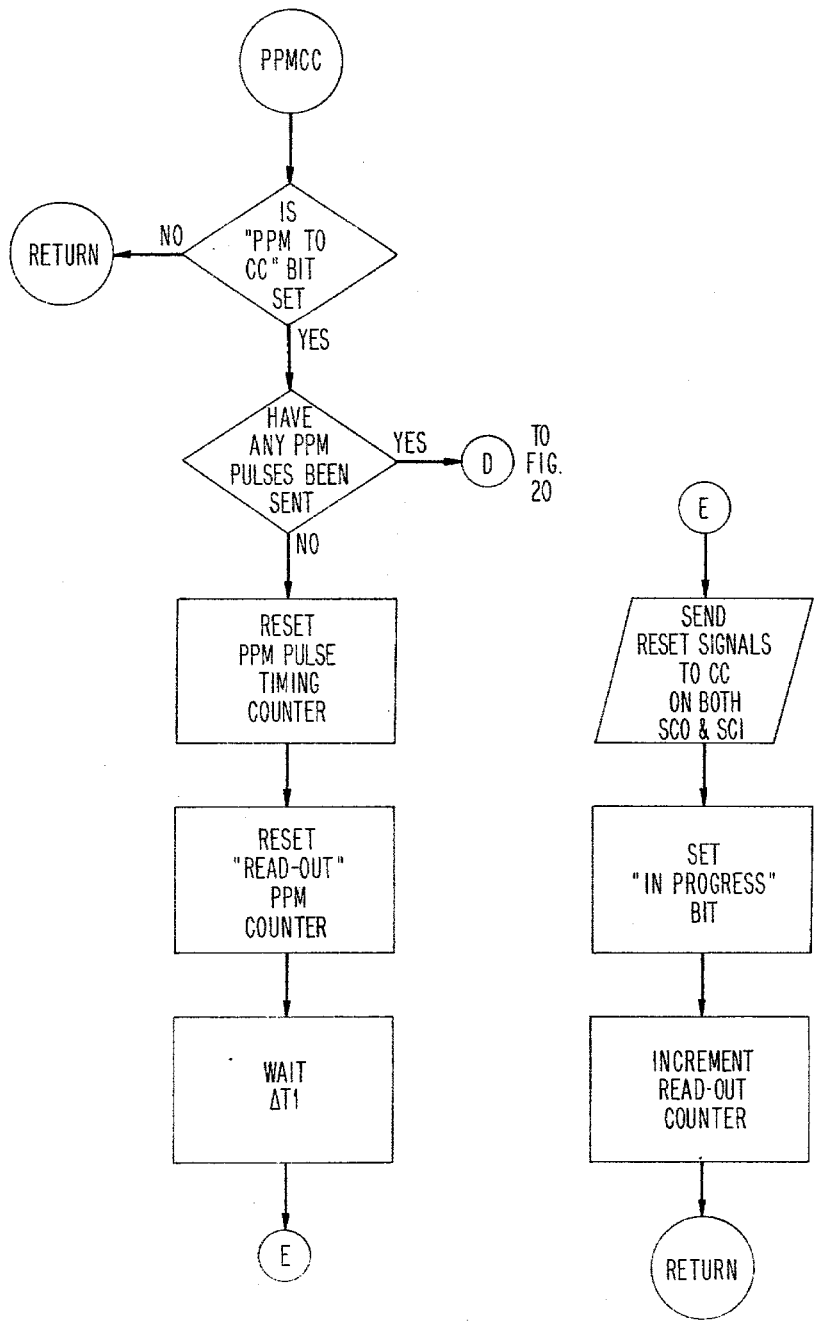
Figure 20:
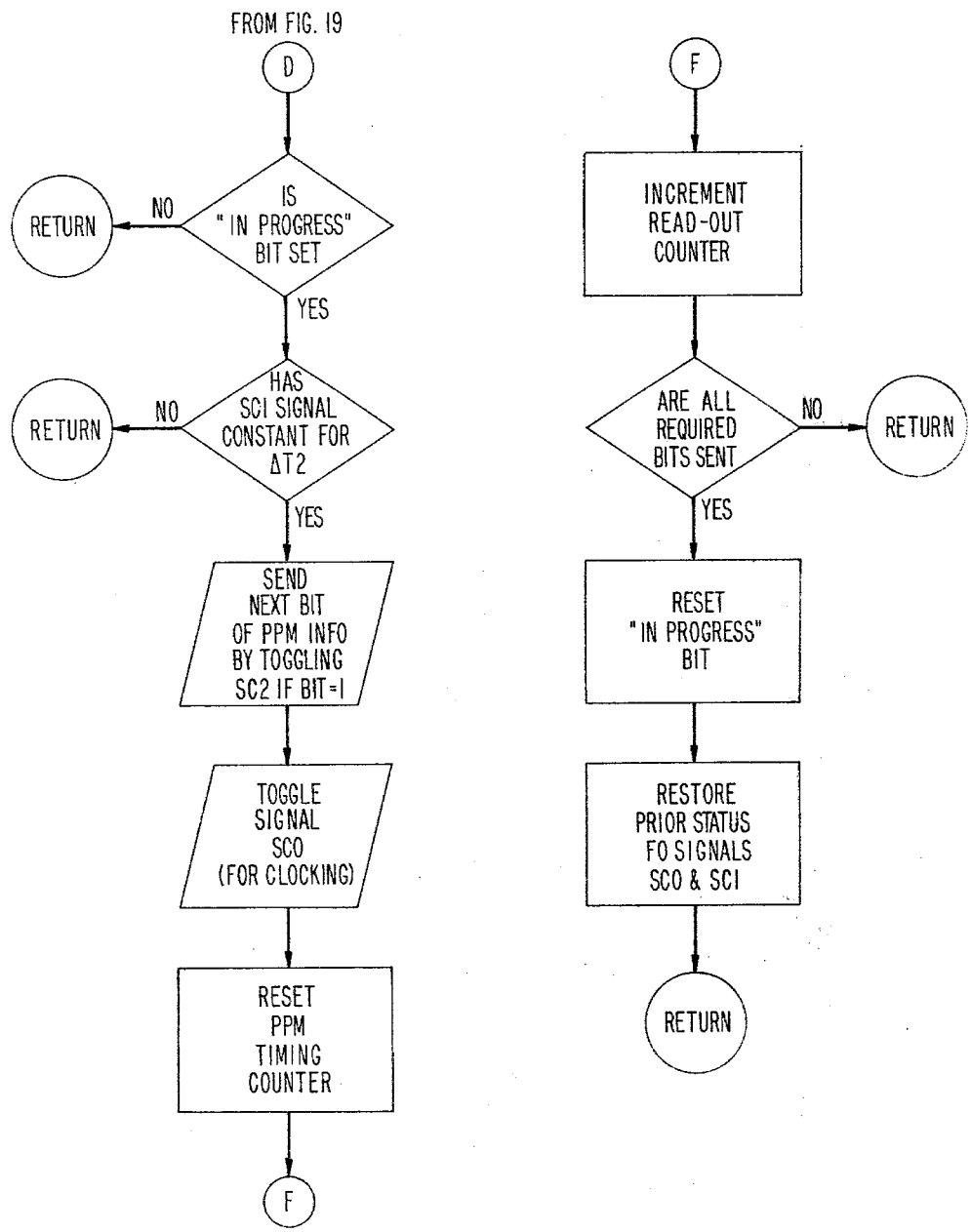

The instruction sequence PPMCC is utilized to transmit the PPM charging pulse count to central control circuit 120 and is depicted as a sequence diagram in FIGS. 19 and 20 of the drawing. On transfer of processor control to sequence PPMCC, a test is made to determine if the requisite bit indicating action is to be taken is presently set. If it is not set a return is made to MAINPG. If the bit is in the set state, a test is made to determine if any PPM pulses have previously been transmitted to central control circuit 120. If none have been transmitted, a PPM pulse length timing counter is reset and cleared. Further, a "readout" PPM counter is also reset indicating that no pulses have been transmitted. The circuit is then established in a wait state for a predetermined period of time ΔT1 to enable the central control circuit 120 to execute function in preparation of reception of the PPM pulse count. Reset signals are then sent to the central control circuit via scanner signals SC0 and SC1. An in-progress bit is then set indicating that a PPM pulse is presently being transmitted and the readout counter is incremented. If prior PPM pulses have been transmitted, a test is made of the in-progress bit to determine if a PPM pulse is presently being transmitted. If not, a return is made to MAINPG. If a pulse is presently in progress, a test is made of the PPM pulse timing counter within memory RWMEM to determine if scanner signal SC1 has been in a constant state for a predetermined period of time ΔT2. If the signal has not been constant for this period of time, a return is made to MAINPG. If the signal has been in a constant state for time ΔT2, the next bit of PPM information is transmitted to the central control circuit 120 by "toggling" scanner signal SC1 if the requisite next bit of PPM information to be transmitted is a binary "1". The scanner signal SC0 is also toggled to provide a clocking signal for central control circuit 120. As shown in FIG. 20, the timing counter associated with the PPM pulses is then reset and the PPM read-out counter within memory RWMEM is incremented. A test is then made to determine if all required bits of the PPM count have been transmitted. If not, a return is made to MAINPG. If all bits have been transmitted, the in-progress bit associated with the PPM count is reset and the prior status of scanner signals SC0 and SC1 is restored.

Figure 21:
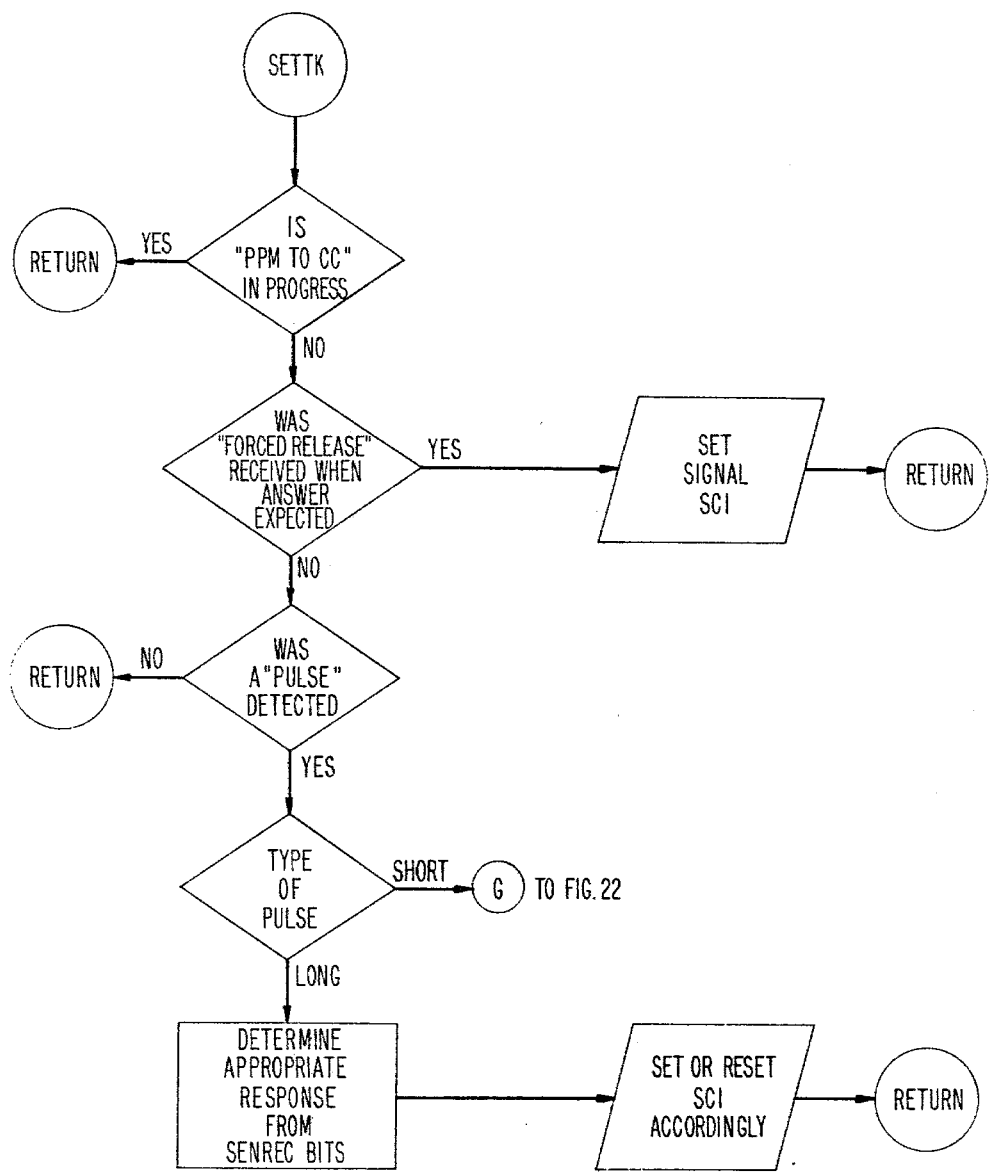
Figure 22:
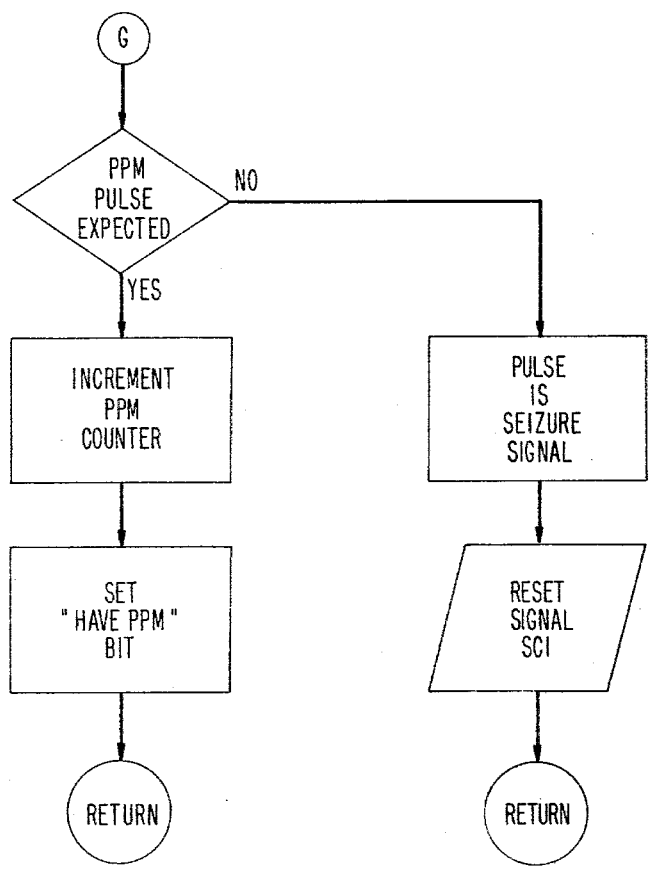

FIGS. 21 and 22 of the drawing depicts diagrams of instruction sequence SETTK which is utilized to establish the scanner signal SC1 in a state indicative of response signals received from the distant office 140 on receiving path ESIG. On transfer of processor control to sequence SETTK, a test is first made to determine if the PPM count is presently being transmitted to central control circuit 120. If the PPM count is being transmitted no action can be taken requiring the scanner signals SC0 and SC1 and a return is made to MAINPG. If the PPM count is not being transmitted to the central control circuit, a test is made to determine if a "forced release" signal has been received when an "answer" signal was expected from the distant office. If such a signal was received the scanner signal SC1 is established in a set state and a return is made to MAINPG. If a forced release signal was not received, a test is made of requisite bits within memory RWMEM to determine if a pulse had been detected from the distant office. If no pulse has been received no action need be taken and a return is made to MAINPG. If a pulse was detected from the distant office, a test is made to determine if the pulse was either a short or long pulse. If the pulse was a long pulse, previously described bits within memory location SENREC determine the appropriate response and the scanner signal SC1 is put in a set or reset state, accordingly. A return is then made to MAINPG. As shown in FIG. 22, if the type of pulse received was a short pulse, a test is made to determine if the pulse is to be defined as a PPM charging pulse. If it is to be so defined, the PPM counter is incremented and a bit is set indicating that a PPM pulse has been received. Accordingly, a return is made to MAINPG. If a PPM pulse was not expected, the short pulse is considered to be a seizure signal from the distant office and scanner signal SC1 is established in the reset state and a return is made to MAINPG.

FIG. 23 depicts a diagram of instruction sequence LNECC, which transmits an appropriate signal via scanner signal SC0 to the central control circuit 120 indicative of the state of line sense circuit 403. On entry to instruction sequence LNECC a test is first made to determine if the line sense circuit is being monitored at this time. If it is not being monitored, a return is immediately made to MAINPG. If the line sense circuit 403 is presently being monitored, the sense circuit is "read" via an input port of processor 300. A signal corresponding to the state of the line sense circuit is then transmitted to central control circuit 120 via scanner signal SC0. If bits are set indicating that a reset of the "monitor line sensor" bit is to be made after one report, a corresponding reset of the monitor line sensor bit occurs. Return is then made to the MAINPG.

The final sequence defined within MAINPG is sequence SCANCC and is utilized to detect any changes in the state signals SC0 through SC2 since a prior "read" of the state signals. FIG. 24 depicts a diagram for instruction sequence SCANCC. On transfer of processor control to sequence SCANCC, the present values of state signals SC0 through SC2 are read via an input port of processor 300. A test is then made to determine if the present values of the state signals are equal to the values associated with the current state of trunk interface circuit 105. If an equality exists, a return is made to MAINPG. If the values are not equal, the new state signals received are defined as being the "current" state signals and a change "indicator" bit is set within memory RWMEM. A return is then made to the MAINPG which detects the change "indicator" bit and transfers to a general instruction module as depicted in FIG. 10 of the drawing and previously described.

Figure 25:
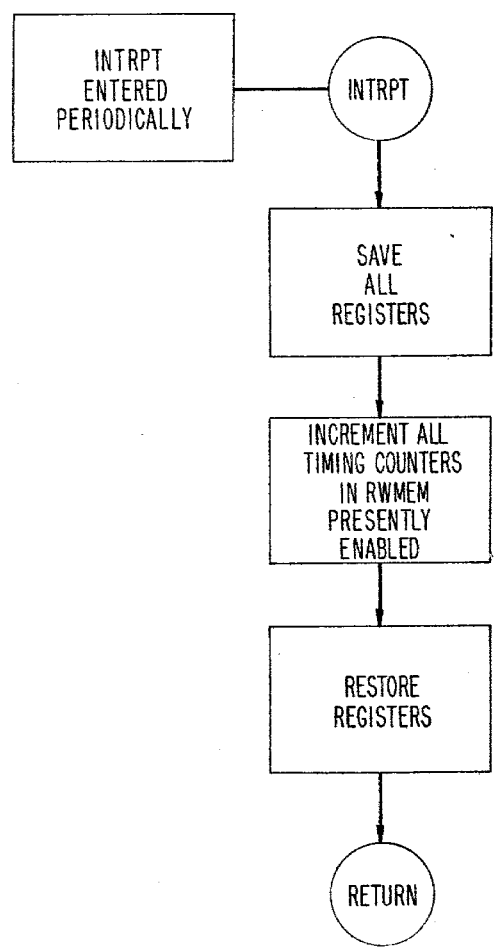

As described with respect to the diagrams of instruction sequences of processor 300, several timing counters are utilized to determine the length of pulses both received and transmitted via trunk interface circuit 105. To accomplish incrementation of these timing counters, processor control is transferred to a timed interrupt instruction sequence named INTRPT at periodic intervals of time. FIG. 25 depicts a diagram of interrupt instruction sequence INTRPT. On transfer of processor control to INTRPT, the contents of all memory registers are saved for corresponding return to the interrupted instruction sequence. After the registers have been saved, timing counters within read/write memory RWMEM which are presently enabled are incremented. Following the incrementation of these timing counters all registers are restored and a return is made to the location from which processor control was interrupted.

The trunk interface circuit 105 described herein is an outgoing trunk interface circuit and utilizes a signaling method known in the art as "E and M" signaling. The principles of the invention are not limited to a trunk interface circuit of the outgoing type. A trunk interface circuit in accordance with the invention may be designed as an incoming or bidirectional trunk interface circuit. Further, various types of signaling methods may be utilized with these interface circuits. It should be understood that the above-described trunk interface circuit 105 is merely an illustrative embodiment and that numerous other arrangements may be devised by those skilled in the art without departing from the spirit and scope of the invention.

What is claimed is:

1. A telecommunication system (100) comprising a switching network (102), a central control circuit (120) adapted for generating sets of state signals, and a communications trunk (103, 105) connected between said switching network and a remote telecommunication system (140) and comprising:
 a transmission facility (103) connected to said remote telecommunication system (140) and comprising a transmission signaling path (MSIG) for transmitting signaling pulses to said remote telecommunication system (140); and
 a trunk interface circuit (105) connected to said transmission facility (103), said switching network (102), and said central control circuit (120);
 characterized in that
 said trunk interface circuit comprises a semiautonomous control circuit (200) comprising memory means (320) having stored therein sets of data words corresponding to said sets of state signals, and is responsive to said sets of state signals to execute control functions determined by said sets of state signals and corresponding sets of data words for selectively receiving or transmitting signaling information on said transmission facility or establishing communication paths between said network and said transmission facility; and
 said semiautonomous control circuit (200) is further responsive to one of said sets of state signals for generating said signaling pulses.

2. A telecommunication system (100) in accordance with claim 1 characterized in that said trunk interface circuit (105) further comprises switching means (201) responsive to switch control signals for establishing communication and signaling connections among said switching network (102), said transmission facility (103), and said semiautonomous control circuit (200); and said semiautonomous control circuit (200) is responsive to said sets of state signals to selectively generate said switch control signals.

3. A telecommunication system (100) in accordance with claim 1 wherein said trunk interface circuit (105) further comprises sensing means (202) selectively connectible to said transmission facility (103) and comprising a sense circuit (405) for detecting information signals received from said remote telecommunication system (140) on said transmission facility (103);
 characterized in that
 said semiautonomous control circuit (200) is responsive to said sets of state signals for storing in said memory means (320) data representative of said information signals detected by said sense circuit (405).

4. A telecommunication system (100) in accordance with claim 1 wherein said trunk interface circuit (105) further comprises switching means (201) connected to said switching network (102) and sensing means (202) selectively connectible to said switching means (201) and comprising a sense circuit (403) for detecting the presence of signals on communication lines (TS, RS) connected between said switching network (102) and said switching means (201);
 characterized in that
 said semiautonomous control circuit (200) is responsive to said state signals for storing in said memory data representative of signals on said communication lines (TS, RS) detected by said sense circuit (403).

5. A telecommunication system (100) in accordance with claim 1 wherein said trunk interface circuit (105) further comprises scanner communication lines (135) connected to said central control circuit (120);
 characterized in that
 said semiautonomous control circuit (200) is responsive to said state signals for applying to said central control circuit (120) scanner signals on said scanner communication lines (135).

6. A telecommunication system (100) in accordance with claim 1 wherein said trunk interface circuit (105) further comprises:
 switching means (201) connected to said switching network (102) and to said transmission facility (103);
 sensing means (202) selectively connectible to said transmission facility (103) and to communication lines (TS, RS) connected between said switching network (102) and said switching means (201) for detecting information signals from said remote telecommunication system (140) on said transmission facility (103) and for detecting signals on said communication lines (TS, RS); and
 said switching means (201) is responsive to a first set of switch control signals for establishing connections between said sensing means (202) and said transmission facility (103) and is responsive to a second set of switch control signals for establishing connections between said sensing means (202) and said communication lines (TS, RS);
 characterized in that
 said semiautonomous control circuit (200) is responsive to one of said sets of state signals for generating said first set of switch control signals and is responsive to another of said sets of state signals for generating said second set of switch control signals.

7. A telecommunication system (100) in accordance with claim 1 wherein said trunk interface circuit (105) further comprises switching means (201) connected to said switching network (102) and sensing means (202) selectively connectible to said transmission facility (103) and to communication lines (TS, RS) connected between said switching network (102) and said switching means (201) for detecting information signals from said remote telecommunication system (140) on said transmission facility (103) and for detecting signals on said communication lines (TS, RS);
 characterized in that said semiautonomous control circuit (200) is responsive to one of said sets of state signals for storing during a first duration of time in said memory means (320) data representative of said information signals and said signals on said communication lines (TS, RS); and said semiautonomous control circuit (200) is responsive to another of said sets of state signals for applying to said central control circuit (120) during a second duration of time scanner signals representative of said data stored during said first duration of time.

8. A telecommunication system (100) in accordance with claim 3 or claim 6 or claim 7 characterized in that said information signals comprise periodic charging pulses wherein the rate of transmission of said periodic charging pulses from said remote telecommunication system (140) is determinative of the monetary charging rate for a telephone call established through said communication trunk (103, 105).

9. A telecommunication system (100) in accordance with claim 5 or claim 7 characterized in that said semiautonomous control circuit (200) comprises means for applying to said central control circuit (120) scanner signals comprising pulses representative of the monetary charge for a telephone call established through said communication trunk (103, 105).

10. A telecommunication system (100) in accordance with claim 1 characterized in that said semiautonomous control circuit (200) is responsive to another of said sets of state signals occurring during a first duration of time for storing in said memory means (320) data representative of the status of said trunk interface circuit (105) and is responsive to said one of said sets of state signals occurring during a second duration of time for generating said signaling pulses wherein said signaling pulses correspond to said stored memory data representative of the status of said trunk interface circuit (105).

11. A telecommunication system (100) in accordance with claim 1 characterized in that said trunk interface circuit (105) has a plurality of states and said memory means (320) comprises sets of memory words wherein each of said sets of memory words uniquely corresponds to one of said plurality of states.

12. A telecommunication system (100) in accordance with claim 11 characterized in that
said central control circuit (120) comprises means for changing the binary state of each of said state signals; and a change of said trunk interface circuit (105) from one of said plurality of states to a next one of said plurality of states is effected by the binary transition of one of said state signals.

13. A telecommunication system (100) in accordance with claim 12 characterized in that said semiautonomous control circuit (200) further comprises a processor (300) having logic circuitry for executing program instructions stored in memory words of said memory means (320).

14. A telecommunication system (100) in accordance with claim 13 characterized in that said memory means (320) further comprises sets of memory words having stored therein program instructions wherein each of said sets of memory words corresponds to one of said plurality of states of said trunk interface circuit (105).

15. A telecommunication system (100) in accordance with claim 13 characterized in that said memory means (320) further comprises a common set of said memory words having stored therein program instructions wherein said common set of memory words corresponds to all of said plurality of states of said trunk interface circuit (105) and selecting execution of said program instructions stored in said common set of memory words is determined by said sets of memory words having predetermined data uniquely corresponding to each of said plurality of states.

16. A telecommunication system (100) comprising a switching network (102), a central control circuit (120) adapted for generating sets of state signals, and a communications trunk (103, 105) connected between said switching network and a remote telecommunication system (140) and comprising:

a transmission facility (103) connected to said remote telecommunication system (140);

a trunk interface circuit (105) connected to said transmission facility (103), said switching network (102), and said central control circuit (120) wherein said trunk interface circuit (105) further comprises:

switching means (201) connected to said switching network (102);

communication lines (TS, RS) connected between said switching network (102) and said switching means (201); and sensing means (202) selectively connectible to said switching means (201) and comprising a first sense circuit (405) for detecting information signals from said remote telecommunication system (140) on said transmission facility (103) and a second sense circuit (403) for detecting signals on said communication lines (TS, RS);

characterized in that said trunk interface circuit comprises a semiautonomous control circuit (200) comprising memory means (320) having stored therein sets of data words corresponding to said sets of state signals, and is responsive to said sets of state signals to execute control functions determined by said sets of state signals and corresponding sets of data words for selectively receiving or transmitting signaling information on said transmission facility or establishing communication paths between said network and said transmission facility;

said semiautonomous control circuit (200) is connected to said switching means (201) and said trunk interface circuit (105) has a plurality of states wherein a change from one of said plurality of states to a next one of said plurality of states is effected by the binary transition of one of said state signals;

said semiautonomous control circuit (200) is responsive to a first set of said state signals and a binary transition of one state signal of said first set of state signals for generating a first set of switch control signals;

said switching means (201) is responsive to said first set of switch control signals for establishing an electrical connection between said transmission facility and said first sense circuit (405); and said semiautonomous control circuit (200) is further responsive to said first set of state signals for storing in said memory means (320) data representative of said information signals detected by said first sense circuit (405).

17. A telecommunication system (100) in accordance with claim 16 characterized in that said semiautonomous control circuit (200) is responsive to a second set of said state signals and a binary transition of one state signal of said second set of state signals for generating a second set of switch control signals;

said switching means (201) is responsive to said second set of switch control signals for establishing an electrical connection between said communication lines (TS, RS) and said second sense circuit (403); and said semiautonomous control circuit (200) is further responsive to said second set of said state signals for storing in said memory means (320) data representative of signals detected by said second sense circuit (403) on said communication lines (TS, RS).

18. A telecommunication system (100) in accordance with claim 16 or claim 17 characterized in that said semiautonomous control circuit (200) is responsive to a further set of said state signals and a binary transition of one state signal of said further set of state signals for applying to said central control circuit (120) scanner signals representative of data stored in said memory means (320).

19. A telecommunication system (100) in accordance with claim 17 characterized in that said semiautonomous control circuit (200) is responsive to a third set of said state signals and a binary transition of one state signal of said third set of state signals for generating a third set of switch control signals; and said switching means (201) is responsive to said third set of switch control signals for establishing voice communication connections between said communication lines (TS, RS) and said transmission facility (103).

20. A telecommunication system (100) in accordance with claim 19 wherein said transmission facility (103) comprises a transmission signaling path (MSIG) for transmitting signaling pulses to said remote telecommunication system (140);

characterized in that said semiautonomous control circuit (200) is responsive to a fourth set of said state signals and a binary transition of one state signal of said fourth set of state signals for generating a fourth set of switch control signals; and said switching means (201) is responsive to said fourth set of switch control signals for generating said signaling pulses on said transmission signaling path (MSIG) wherein the length of said signaling pulses is defined by said predetermined sets of data stored in said memory means (320).

21. In a telecommunication system (100) comprising a central control circuit (120), a transmission facility (103) connected to a remote telecommunication system (140), and a trunk interface circuit (105) having a plurality of states and comprising a memory means (320), a method for transmitting signaling pulses of various durations of time to said remote telecommunication system (140) comprising the steps of:

A. storing in said memory means (320) sets of data words representative of signaling pulses to be transmitted to said remote telecommunication system (140), wherein each of said sets of data words corresponds to one of said plurality of states;

B. generating a first set of state signals from said central control circuit (200) corresponding to a first one of said plurality of states and applying said first set of state signals to said trunk interface circuit (105);

C. retrieving one of said sets of data words from said memory means (320) corresponding to said first one of said plurality of states; and D. transmitting to said remote telecommunication system (140) on said transmission facility (103) signaling pulses having durations of time determined by said one of said sets of data.

22. In a telecommunication system (100) comprising a switching network (102), a central control circuit (120), a transmission facility (103) connected to a remote telecommunication system (140), and a trunk interface circuit (105) having a plurality of states and connected to said central control circuit (120) and to said transmission facility (103) and comprising a switching means (201) for interconnecting said switching network (102) and said transmission facility (103), and a semiautonomous control circuit (200) having a memory means (320), a method for controlling the establishing and altering of communication paths between said transmission facility and said switching network comprising the steps of:

A. storing in said memory means (320) sets of data words representative of switch control signals, wherein each of said sets of data words corresponds to one of said plurality of states;

B. generating a first set of state signals from said central control circuit (120) and applying said first set of state signals to said semiautonomous control circuit (200), thereby establishing said trunk interface circuit (105) in a first one of said plurality of states;

C. applying a first set of said switch control signals to said switching means (201) and controlling the establishment of a set of said communication paths;

D. storing in said memory means (320) data words representative of said first set of said switch control signals;

E. generating a second set of state signals from said central control circuit (120) and applying said second set of state signals to said semiautonomous control circuit (200) to change said trunk interface circuit (105) from said first one of said plurality of states to a second one of said plurality of states;

F. comparing the set of data words corresponding to said second one of said plurality of states with the data words representative of said first set of said switch control signals; and G. applying a second set of said switch control signals to said switching means (201) when an inequality is found in the comparison of step F, wherein said second set of said switch control signals control the altering of said set of communication paths.

* * * * *